United States Patent
Kobayashi et al.

(10) Patent No.: US 7,006,906 B2
(45) Date of Patent: Feb. 28, 2006

(54) ELECTRIC DRIVE CONTROL APPARATUS, METHOD AND PROGRAM THEREFOR

(75) Inventors: Yasuhiko Kobayashi, Anjo (JP); Yasuo Yamaguchi, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 229 days.

(21) Appl. No.: 10/733,449

(22) Filed: Dec. 12, 2003

(65) Prior Publication Data

US 2005/0075766 A1    Apr. 7, 2005

(30) Foreign Application Priority Data

Dec. 26, 2002    (JP)    ............... 2002-378506

(51) Int. Cl.
 B60L 9/00    (2006.01)
 B60L 11/00    (2006.01)
 B60K 1/00    (2006.01)
(52) U.S. Cl. ........................... 701/22; 180/65.1
(58) Field of Classification Search .......... 701/22; 180/65.1, 65.2, 65.3; 310/46
 See application file for complete search history.

(56) References Cited

U.S. PATENT DOCUMENTS 6,906,442 B1 *    6/2005   Yamaguchi ............ 310/156.43

2005/0046369 A1 *    3/2005   Kobayashi et al. ......... 318/432

FOREIGN PATENT DOCUMENTS

JP        A 5-130710        5/1993

* cited by examiner

Primary Examiner—Yonel Beaulieu
(74) Attorney, Agent, or Firm—Oliff & Berridge, PLC

(57) ABSTRACT

An electric drive control apparatus which prevents the voltage from being saturated and does not cause the driver to feel uncomfortable during driving. The electric drive control apparatus includes an electrically operated machine, an instruction value calculation processing unit that calculates an instruction value based on a target electrically operated machine torque and on the rotational speed of the electrically operated machine, an output signal calculation processing unit that calculates an output signal based on the instruction value, a current generating unit that generates a current based on the output signal and supplies the current to the electrically operated machine, a change-in-the-voltage-saturation calculation processing unit that calculates a change in the voltage saturation that varies depending upon the degree of occurrence of the voltage saturation accompanying the drive of the electrically operated machine, and a change-in-the-control-quantity correction processing unit correcting a magnetic pole position depending upon the change in the voltage saturation.

16 Claims, 13 Drawing Sheets

| Vdc=42 | TARGET DRIVE MOTOR TORQUE TM* [Nm] | | | | | | | | | | |
|---|---|---|---|---|---|---|---|---|---|---|---|
| TARGET DRIVE MOTOR ROTATIONAL SPEED NM* [rpm] | 0 | 10 | 20 | 30 | 40 | 50 | 60 | 70 | 80 | 90 | 100 |
| 0 | 0 | 70 | 130 | 190 | 250 | 300 | 360 | 420 | 480 | 540 | 620 |
| 1000 | 0 | 70 | 130 | 190 | 250 | 300 | 360 | 420 | 480 | 540 | 620 |
| 2000 | 0 | 70 | 130 | 190 | 250 | 300 | 366 | 420 | 480 | 536 | 536 |
| 3000 | 0 | 70 | 130 | 190 | 250 | 308 | 377 | 417 | 417 | 417 | 417 |
| 4000 | 66 | 60 | 123 | 191 | 258 | 338 | 382 | 382 | 382 | 382 | 382 |
| 5000 | 92 | 108 | 155 | 210 | 293 | 401 | 401 | 401 | 401 | 401 | 401 |
| 6000 | 130 | 150 | 199 | 251 | 347 | 510 | 510 | 510 | 510 | 510 | 510 |
| 7000 | 167 | 170 | 219 | 270 | 409 | 409 | 409 | 409 | 409 | 409 | 409 |
| 8000 | 199 | 199 | 245 | 301 | 356 | 356 | 356 | 356 | 356 | 356 | 356 |
| 9000 | 224 | 221 | 272 | 322 | 322 | 322 | 322 | 322 | 322 | 322 | 322 |
| 10000 | 250 | 227 | 298 | 360 | 360 | 360 | 360 | 360 | 360 | 360 | 360 |
| 11000 | 300 | 300 | 300 | 300 | 300 | 300 | 300 | 300 | 300 | 300 | 300 |

| Vdc=42 | TARGET DRIVE MOTOR TORQUE TM* [Nm] | | | | | | | | | | |
|---|---|---|---|---|---|---|---|---|---|---|---|
| Target Drive Motor Rotational Speed NM* [rpm] | 0 | 10 | 20 | 30 | 40 | 50 | 60 | 70 | 80 | 90 | 100 |
| 0 | 30 | 30 | 30 | 30 | 30 | 30 | 30 | 30 | 30 | 30 | 30 |
| 1000 | 30 | 30 | 30 | 30 | 30 | 30 | 30 | 30 | 30 | 30 | 30 |
| 2000 | 30 | 30 | 30 | 30 | 30 | 30 | 30 | 30 | 30 | 45 | 45 |
| 3000 | 30 | 30 | 30 | 30 | 30 | 34 | 41 | 44 | 44 | 44 | 44 |
| 4000 | 76 | 31 | 29 | 38 | 43 | 51 | 54 | 54 | 54 | 54 | 54 |
| 5000 | 80 | 69 | 57 | 53 | 57 | 65 | 65 | 65 | 65 | 65 | 65 |
| 6000 | 82 | 78 | 68 | 63 | 67 | 75 | 75 | 75 | 75 | 75 | 75 |
| 7000 | 83 | 80 | 72 | 67 | 74 | 74 | 74 | 74 | 74 | 74 | 74 |
| 8000 | 84 | 82 | 75 | 70 | 72 | 72 | 72 | 72 | 72 | 72 | 72 |
| 9000 | 84 | 84 | 77 | 72 | 72 | 72 | 72 | 72 | 72 | 72 | 72 |
| 10000 | 85 | 84 | 78 | 75 | 75 | 75 | 75 | 75 | 75 | 75 | 75 |
| 11000 | 90 | 90 | 90 | 90 | 90 | 90 | 90 | 90 | 90 | 90 | 90 |

ELECTRIC DRIVE CONTROL APPARATUS, METHOD AND PROGRAM THEREFOR

This application claims priority from JP 2002-378506, filed Dec. 26, 2002, the disclosure of which is incorporated herein by reference thereto.

BACKGROUND OF THE INVENTION

1. Field of Invention

The invention relates to an electric drive control apparatus, an electric drive control method and a program therefor.

2. Description of Related Art

In a conventional electric drive unit which is mounted on a vehicle, for example, on an electric vehicle or an electric car, and which produces a torque of a drive motor which is an electrically operated machine, it is a practice to transmit the drive motor torque to the drive wheels to obtain a driving force.

Further, in an electric drive unit mounted on an electric vehicle or on a hybrid vehicle and transmits the engine torque or part of the engine torque to a generator (generator-motor) which is a first electrically operated machine and transmits the rest of the engine torque to the drive wheels, it is a practice to provide a planetary gear unit having a sun gear, a ring gear and a carrier, to couple the carrier to the engine, to couple the ring gear to the drive wheels, to couple the sun gear to the generator, and to transmit the rotation produced by the ring gear and by a drive motor which is a second electrically operated machine to the drive wheels to obtain a driving force.

In the generator and the drive motor, there are arranged a rotor which is allowed to freely rotate and has a pair of magnetic poles comprising permanent magnets of N-pole and S-pole, and a stator disposed on the outer side of the rotor in the radial direction and having stator coils of U-phase, V-phase and W-phase.

The electric car is furnished with a drive motor control apparatus as an electromechanical controller. The hybrid vehicle is furnished with a generator control apparatus and a drive motor control apparatus as an electrically operated machine control apparatus. Pulse width modulation signals of the U-phase, V-phase and W-phase generated by the electrically operated machine control apparatus are sent to an inverter, and phase currents generated by the inverter are fed, i.e., currents of the U-phase, V-phase and W-phase, to the stator coils to energize the drive motor thereby to obtain a drive motor torque, or to drive the generator to obtain a generator torque.

In the above drive motor control apparatus, for example, a feedback control is executed by the vector control operation on a d-q axis model by setting a d-axis in a direction of the magnetic pole pair of the rotor, and setting a q-axis in a direction at right angles to the d-axis. Therefore, the drive motor control apparatus detects currents fed to the stator coils, a magnetic pole position of the rotor and a DC voltage at the input of the inverter, converts the detected currents into a d-axis current and a q-axis current based on the magnetic pole position, and calculates a d-axis current instruction value and a q-axis current instruction value representing target values of the d-axis current and the q-axis current based on the DC voltage in order to bring a deviation between the d-axis current and the d-axis current instruction value to zero (0) and a deviation between the q-axis current and the q-axis current instruction value to zero (0) (see, for example, JP-A-5-130710).

In the above conventional electric drive unit, however, a current instruction value that cannot be realized is set if there exist errors in the sensors, such as a current sensor for detecting the current, a magnetic pole position sensor for detecting the magnetic pole position or a voltage sensor for detecting the DC voltage, or if there is a change in the device constants, such as counter electromotive force constant MIf of the drive motor, inductances Ld, Lq of the stator coils, and resistance Ra of the stator coils accompanying a change in the temperature.

In such a case, the voltage is saturated, a deviation occurs between a target drive motor torque TM* and a drive motor torque TM that is really produced, causing the driver to feel uncomfortable while traveling and making it difficult to drive the drive motor.

SUMMARY OF THE INVENTION

It is an object of the invention to provide an electric drive control apparatus capable of preventing the occurrence of voltage saturation, so the driver does not feel uncomfortable while traveling or which does not make it difficult to drive the drive motor that results from the occurrence of voltage saturation by solving the problems inherent in the above conventional electric drive unit. The invention further provides an electric drive control method and a program therefor.

For this purpose, the electric drive control apparatus of the invention comprises an electrically operated machine, instruction value calculation processing means for calculating an instruction value based on a target electrically operated machine torque representing a target value of the electrically operated machine torque and on the rotational speed of the electrically operated machine, output signal calculation processing means for calculating an output signal based on the instruction value, a current generating unit for generating a current based on the output signal and for supplying the current to the electrically operated machine, change-in-the-voltage-saturation calculation processing means for calculating, based on the instruction value, a change in the voltage saturation that varies depending upon the degree of occurrence of the voltage saturation accompanying the drive of the electrically operated machine, and change-in-the-control-quantity correction processing means for correcting a change in the control quantity based on the change in the voltage saturation. Here, the change in the control quantity is a magnetic pole position of the electrically operated machine.

Another electric drive control apparatus of the invention comprises an electrically operated machine, instruction value calculation processing means for calculating an instruction value based on a target electrically operated machine torque representing a target value of the electrically operated machine torque and on the rotational speed of the electrically operated machine, output signal calculation processing means for calculating an output signal based on the instruction value, a current generating unit for generating a current based on the output signal and for supplying the current to the electrically operated machine, change-in-the-voltage-saturation calculation processing means for calculating, based on the output signal, a change in the voltage saturation that varies depending upon the degree of occurrence of the voltage saturation accompanying the drive of the electrically operated machine, and change-in-the-control-quantity correction processing means for correcting a change in the control quantity based on the change in the voltage saturation. Here, the change in the control quantity is a magnetic pole position of the electrically operated machine.

A further electric drive control apparatus of the invention comprises an electrically operated machine, instruction value calculation processing means for calculating an instruction value based on a target electrically operated machine torque representing a target value of the electrically operated machine torque and on the rotational speed of the electrically operated machine, output signal calculation processing means for calculating an output signal based on the instruction value, a current generating unit for generating a current based on the output signal and for supplying the current to the electrically operated machine, change-in-the-voltage-saturation calculation processing means for calculating, based on the instruction value, a change in the voltage saturation that varies depending upon the degree of occurrence of the voltage saturation accompanying the drive of the electrically operated machine, and change-in-the-control-quantity correction processing means for correcting a change in the control quantity based on the change in the voltage saturation. Here, the change in the control quantity is a rotational speed of the electrically operated machine.

A still further electric drive control apparatus of the invention comprises an electrically operated machine, instruction value calculation processing means for calculating an instruction value based on a target electrically operated machine torque representing a target value of the electrically operated machine torque and on the rotational speed of the electrically operated machine, output signal calculation processing means for calculating an output signal based on the instruction value, a current generating unit for generating a current based on the output signal and for supplying the current to the electrically operated machine, change-in-the-voltage-saturation calculation processing means for calculating, based on the output signal, a change in the voltage saturation that varies depending upon the degree of occurrence of the voltage saturation accompanying the drive of the electrically operated machine, and change-in-the-control-quantity correction processing means for correcting a change in the control quantity based on the change in the voltage saturation. Here, the change in the control quantity is a rotational speed of the electrically operated machine.

In a further electric drive control apparatus of the invention, the instruction value comprises a current instruction value and a voltage instruction value.

In a further electric drive control apparatus of the invention, the voltage instruction value comprises a voltage instruction value of a non-interference term and a voltage instruction value of an integration term.

In a further electric drive control apparatus of the invention, the change-in-the-voltage-saturation calculation processing means calculates a change in the voltage saturation based on the on time of the output signal.

In a further electric drive control apparatus of the invention, an instruction value corresponding to an electrically operated machine torque that can be produced is generated when a target electrically operated machine torque generated accompanying the correction of the rotational speed of the electrically operated machine is greater than a limit electrically operated machine torque.

In a further electric drive control apparatus of the invention, an instruction value is generated at the center of a voltage limit ellipse as the rotational speed of the electrically operated machine becomes greater than a limit rotational speed of the electrically operated machine accompanying the correction of the rotational speed of the electrically operated machine.

In an electric drive control method of the invention, an instruction value is calculated based on a target electrically operated machine torque representing a target value of the electrically operated machine torque and on the rotational speed of the electrically operated machine, an output signal is calculated based on the instruction value, a current is generated based on the output signal, the current is supplied to the electrically operated machine, a change in the voltage saturation is calculated, based on the instruction value, that varies depending upon the degree of occurrence of the voltage saturation accompanying the drive of the electrically operated machine, and the magnetic pole position is corrected depending upon the change in the voltage saturation.

In a program for an electric drive control method of the invention, a computer operates as the instruction value calculation processing means for calculating an instruction value based on a target electrically operated machine torque representing a target value of the electrically operated machine torque and on the rotational speed of the electrically operated machine, as the output signal calculation processing means for calculating an output signal based on the instruction value, as the change-in-the-voltage-saturation calculation processing means for calculating, based on the instruction value, a change in the voltage saturation that varies depending upon the degree of occurrence of the voltage saturation accompanying the drive of the electrically operated machine, and as the change-in-the-control-quantity correction processing means for correcting a magnetic pole position based on the change in the voltage saturation.

BRIEF DESCRIPTION OF THE DRAWINGS

Embodiments of the invention will now be described in detail with reference to the drawings, in which:

FIG. 14 is a diagram of a map of current instruction values according to the second embodiment of the invention;

FIG. 15 is a diagram of a map of current phase instruction values according to the second embodiment of the invention.

DETAILED DESCRIPTION OF PREFERRED EMBODIMENTS

Although the description here deals with an electric car, as the vehicle or as the electric vehicle, such is exemplary only, as the invention can also be applied to a hybrid vehicle.

Figure 1:
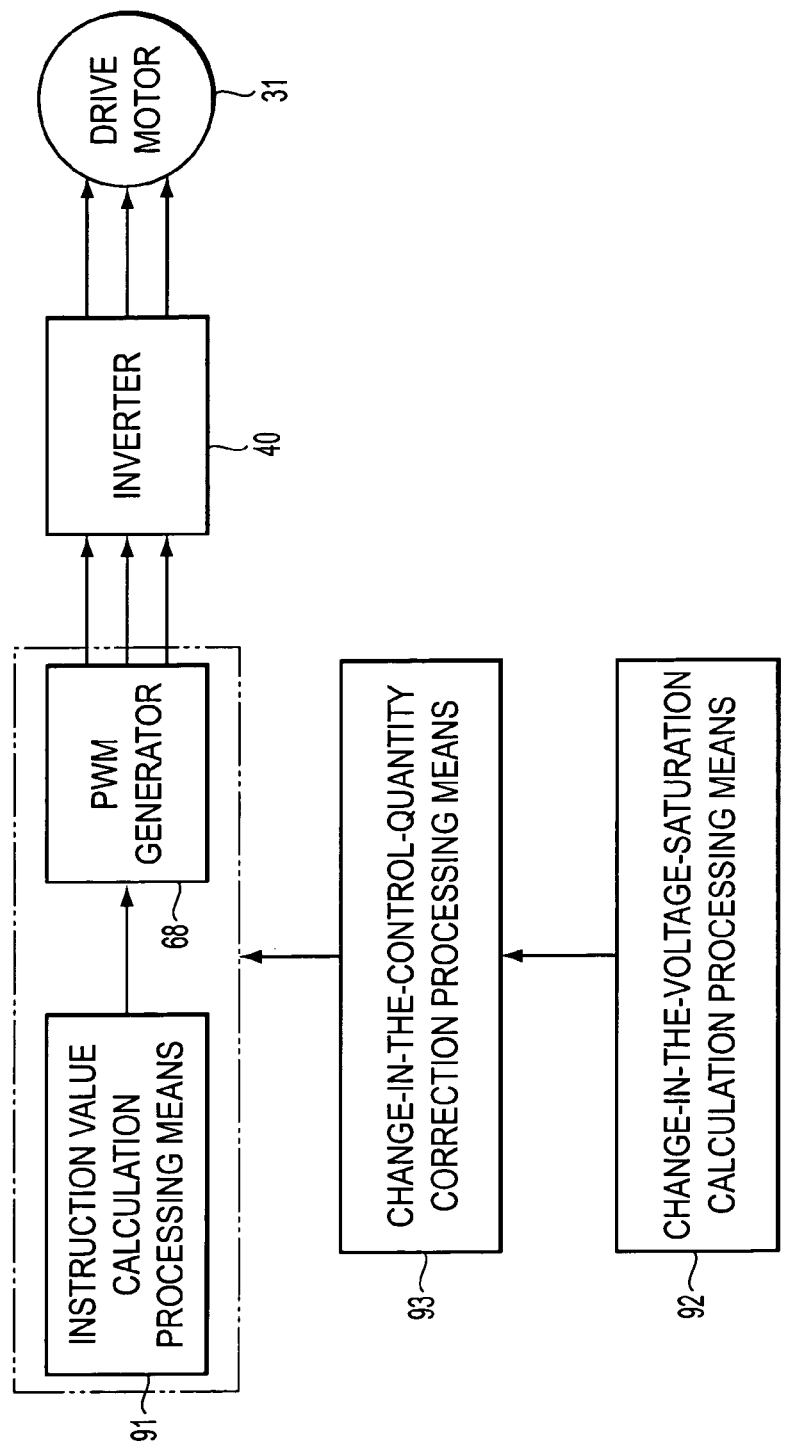
FIG. 1 is a functional block diagram of an electric drive control apparatus according to a first embodiment of the invention.

In FIG. 1, reference numeral 31 denotes a drive motor which is an electrically operated machine, and 91 denotes instruction value calculation processing means that calculates an instruction value based on a target drive motor torque TM*, that represents the target value of the drive motor torque TM for a torque of the drive motor 31, and on a rotational speed NM of the drive motor, as the rotational speed of the electrically operated machine, and a PWM generator 68 which provides an output signal calculation processing means that calculates an output signal based on the instruction value. An inverter 40 provides a current generating unit that generates a current based on the output signal and supplies the current to the drive motor 31. A change-in-the-voltage-saturation calculation processing means 92 calculates, based on the instruction value, a change in the voltage saturation that varies depending upon the degree of occurrence of the voltage saturation accompanying the drive of the drive motor 31. Lastly, a change-in-the-control-quantity correction processing means 93 corrects the change in the control quantity based on the change in the voltage saturation.

Described below is an electric drive control apparatus mounted on the electric car.

The drive motor 31 is a DC brushless drive motor and is mounted on a drive shaft of an electric car. The drive motor 31 includes a rotor (not shown) which freely rotates, and a stator arranged on the outer side of the rotor in the radial direction. The rotor includes a rotor core and permanent magnets arranged on a plurality of portions of the rotor core in the circumferential direction, and pairs of magnetic poles constituted by the S-pole and N-pole of the permanent magnets. The stator includes a stator core (not shown) forming teeth at a plurality of places in the circumferential direction and protruding inward in the radial direction, and stator coils 11 to 13 of U-phase, V-phase and W-phase wound on the teeth.

On the output shaft of the rotor, there is disposed a magnetic pole position sensor 21 of the pulse generation type as a magnetic pole position detector unit for detecting a magnetic pole position θ. The magnetic pole position sensor 21 generates a magnetic pole position signal SGθ as a sensor output, and sends it to the drive motor control unit 45 which is the electrically operated machine control unit.

To run the electric car by driving the drive motor 31, a direct current from a storage battery 14 is converted into phase currents, i.e., currents Iu, Iv and Iw of U-phase, V-phase and W-phase through an inverter 40 which is a current generator. The currents Iu, Iv and Iw are fed to the stator coils 11 to 13.

For this purpose, the inverter 40 includes transistors Tr1 to Tr6 as six switching elements, and generates the currents Iu, Iv and Iw of the phases upon selectively turning the transistors Tr1 to Tr6 on and off.

In this embodiment, the inverter 40 is used as a current generating device. Rather than the inverter 40, however, a power module, such as IGBT formed by incorporating 2 to 6 switching elements in a package, or an IPM formed by incorporating a drive circuit or the like circuit in the IGBT can be used.

A voltage sensor 15, which is a voltage detector unit, is arranged on the inlet side of where a current is supplied from the battery 14 to the inverter 40. The voltage sensor 15 detects a DC voltage Vdc on the inlet side of the inverter 40 and sends the sensed voltage amount Vdc to the drive motor control unit 45. It is also allowable to use a battery voltage as a DC voltage Vdc. In this case, a battery voltage sensor is disposed as a voltage detector unit on the battery 14.

An electric drive unit is provided by the drive motor 31, inverter 40 and drive wheels (not shown). Reference numeral 17 denotes a capacitor.

Here, the stator coils are star-connected. Therefore, if current values of two phases are determined, a current value of the remaining phase is determined. In order to control the currents Iu, Iv and Iw of the phases, therefore, current sensors 33, 34, that work as current detector units, are arranged on the lead wires of the stator coils of the U-phase and V-phase to detect currents Iu and Iv of the U-phase and V-phase as detection currents iu and iv. The current sensors 33, 34 send the values of the detection currents iu and iv to the drive motor control unit 45.

In addition to the CPU (not shown) that works as a computer, the drive motor control unit 45 includes a storage unit (not shown), such as RAM or ROM, for recording data and various programs. A map of current instruction values is set to the ROM. The precise structure of the drive motor control unit 45 may be software, hardware, or a combination.

The ROM stores various programs and data, which, however, may be stored in an external recording medium. In this case, a flash memory is arranged in the drive motor control unit 45, and the programs and data are read out from the external recording medium and are stored in the flash memory. By replacing the external recording medium, therefore, the programs and data can be updated. Alternatively, they could be hard wired in a circuit.

Reference numeral 22 denotes an accelerator sensor arranged neighboring the accelerator pedal 23 which is the accelerator operation unit. The accelerator sensor 22 detects the accelerator opening degree α which represents the amount the accelerator pedal 23 is operated (depressed).

Operation of the drive motor control unit 45 will now be described.

First, position detection processing means (not shown) in the drive motor control unit 45 executes the position detection processing, reads the magnetic pole position signal SGθ sent from the magnetic pole position sensor 21, and detects a magnetic pole position θ based on the magnetic pole position signal SGθ. For this purpose, rotational speed calculation processing means (not shown) in the position detection processing means executes a rotational speed calculation processing, calculates an average velocity between pulses which are the magnetic pole position signals SGθ as an electric angular velocity ω of the drive motor 31, and magnetic pole position calculation processing means (not shown) in the position detection processing means executes a magnetic pole position calculation processing and calculates a magnetic pole position θ in compliance with the electric angular velocity ω. Here, the rotational speed calculation processing means also calculates the drive motor rotational speed NM, $$NM = 60 \cdot \omega / 2\pi$$

based on the electric angular velocity ω. The rotational speed of the electrically operated machine is represented by the rotational speed NM of the drive motor.

Next, the magnetic pole position correction processing means (not shown) of the position detection processing means executes the magnetic pole position correction processing, reads a change λ in the voltage saturation that varies depending upon the degree of occurrence of the voltage saturation accompanying the drive of the drive motor 31, and corrects the magnetic pole position θ based on the change λ in the voltage saturation.

Figure 2:
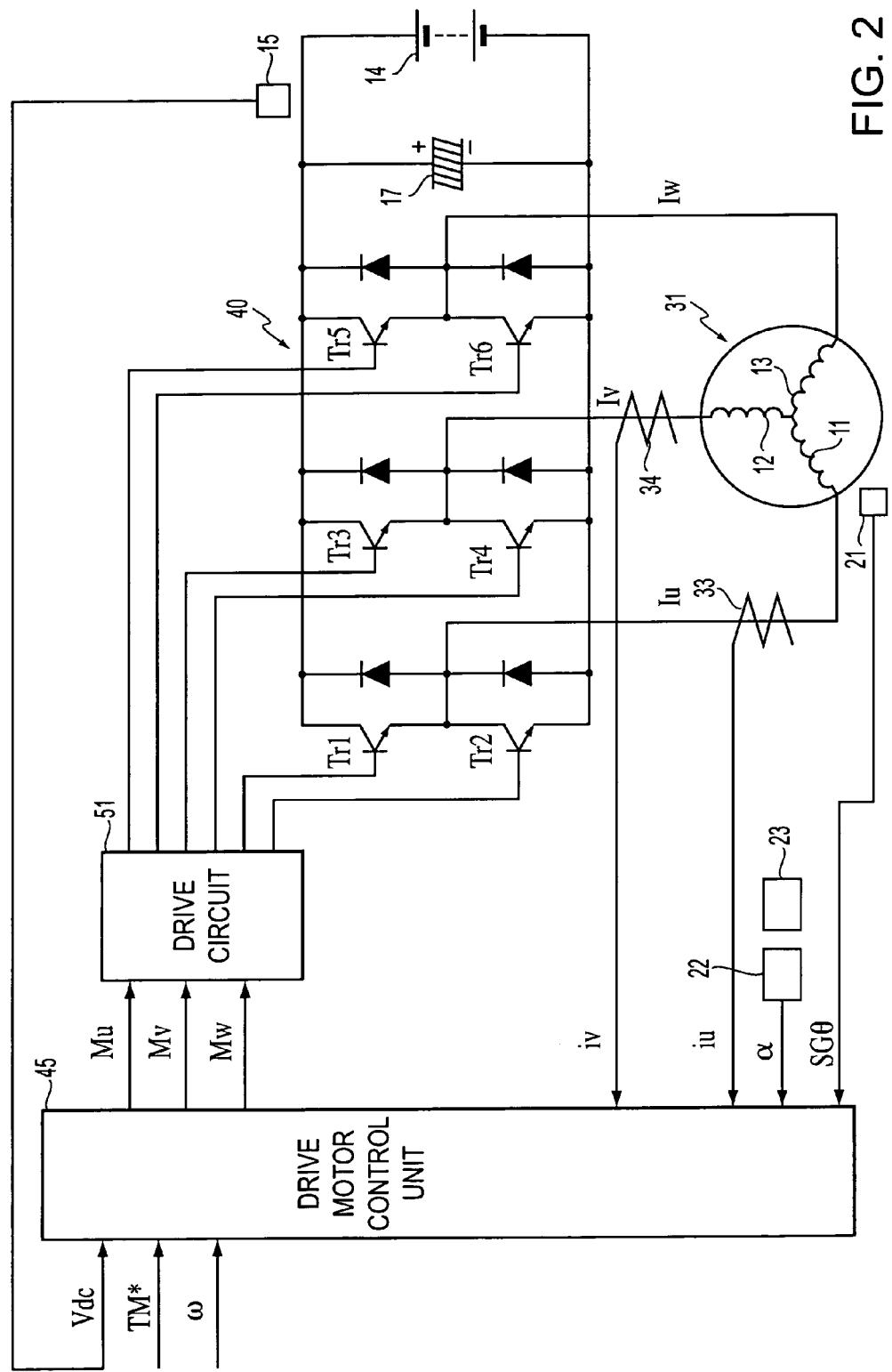
FIG. 2 is a schematic illustration of the electric drive control apparatus according to the first embodiment of the invention.
Figure 3:
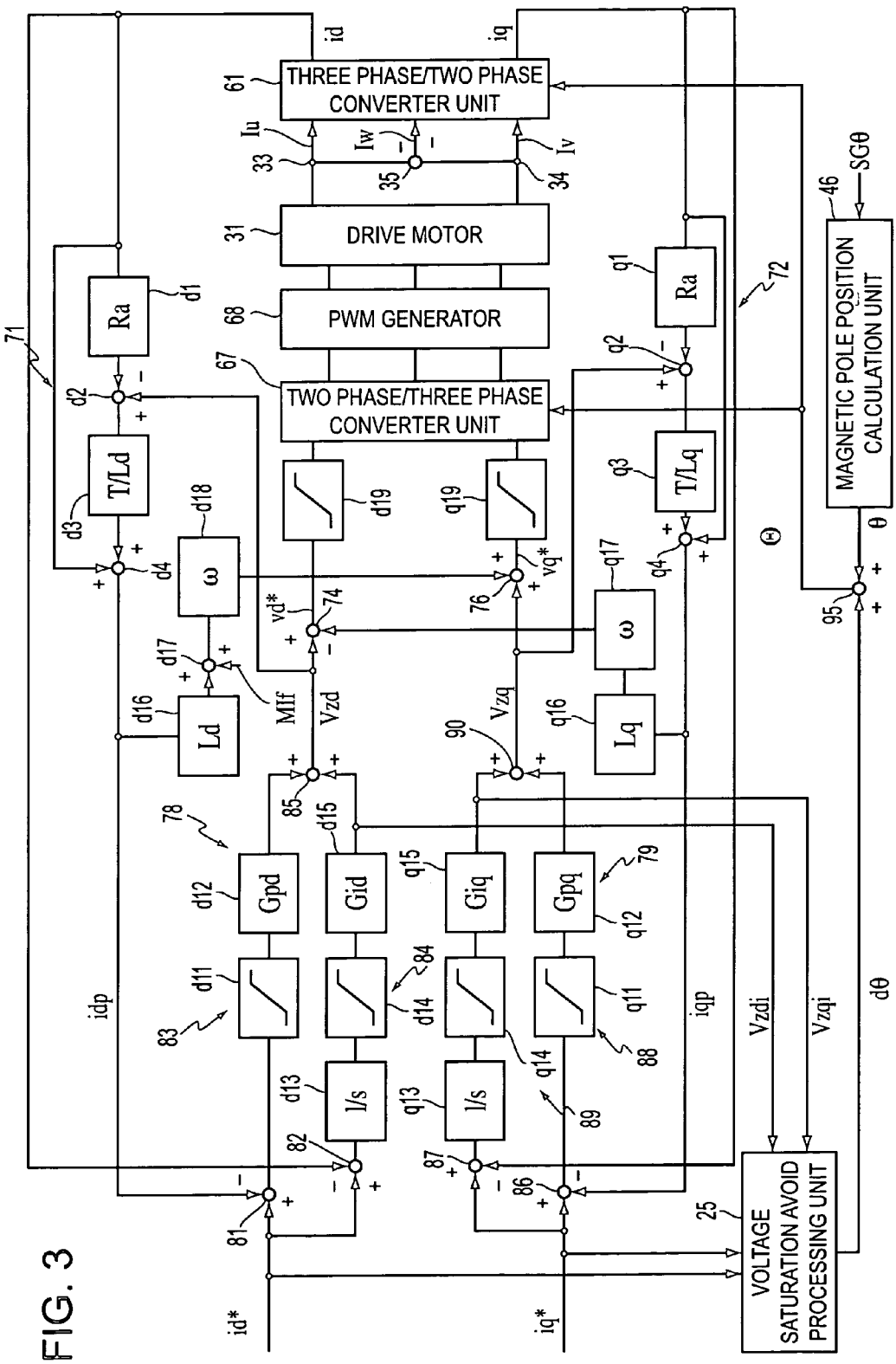
FIG. 3 is a block diagram of the electric drive control apparatus according to the first embodiment of the invention.

Next, the drive motor control processing means (not shown) in the drive motor control unit 45 executes the drive motor control processing, and drives the drive motor 31 based on at least two detection currents of the detection currents iu, iv, iw, magnetic pole position θ, DC voltage Vdc, and other inputs such as shown in FIG. 2.

For this purpose, a torque instruction/current instruction converter unit, which is the current instruction value calculation processing means (not shown) in the drive motor control processing means, executes a current instruction value calculation processing, and calculates a d-axis current instruction value id* and a q-axis current instruction value iq* representing target values of the d-axis current id and the q-axis current iq. Therefore, the vehicle speed detection processing means (not shown) in the drive motor control unit 45 executes the vehicle speed detection processing, detects the vehicle speed V corresponding to the rotational speed NM of the drive motor, and sends the detected vehicle speed V to a vehicle control apparatus (not shown) which controls the entire electric car. The vehicle instruction value calculation processing means (not shown) in the vehicle control apparatus executes the vehicle instruction value calculation processing, reads the vehicle speed V and the accelerator opening degree α, calculates a torque TO* required for the vehicle based on the vehicle speed V and the accelerator opening degree α, generates a target drive motor torque (torque instruction value) TM* representing a target value of the drive motor torque TM depending upon the torque TO* required for the vehicle, and sends it to the drive motor control unit 45.

Here, the drive motor control unit 45 executes a feedback control based on the vector control operation on a d-q axis model by setting the d-axis in a direction of the pair of magnetic poles of the rotor and setting the q-axis in a direction at right angles to the d-axis. The torque of the electrically operated machine comprises the drive motor torque TM, and the target torque of the electrically operated machine comprises the target drive motor torque TM*.

Therefore, the torque instruction/current instruction converter unit reads the DC voltage Vdc, electric angular velocity ω and target drive motor torque TM*, makes a reference to the map of current instruction values, and calculates a d-axis current instruction value id* and a q-axis current instruction value iq* corresponding to the target drive motor torque TM* as current instruction values. Further, first instruction value calculation processing means is provided by the current instruction value calculation processing means, a first instruction value calculation processing is provided by the current instruction value calculation processing, and a first instruction value comprises the d-axis current instruction value id* and the q-axis current instruction value iq*.

Next, detection current obtain processing means (not shown) in the drive motor control processing means executes a detection current obtain processing, reads and obtains the detection currents iu and iv, and the arithmetic unit 35 in the detection current obtain processing means calculates and obtains a detection current iw, $$iw = -iu - iv$$

based on the detection currents iu and iv.

Then, a three phase/two phase converter unit 61, which is the first conversion processing means in the drive motor control processing means, executes a three phase/two phase conversion which is a first conversion processing, reads a magnetic pole position θ after correction by the magnetic pole position correction processing, and converts the detection currents iu, iv and iw into a d-axis current id and a q-axis current iq.

Thus, the d-axis current id and the q-axis current iq are calculated as real currents, and the d-axis current instruction value id* and the q-axis current instruction value iq* are calculated. Then, the feedback control is executed based on the d-axis current, q-axis current, as well as on the d-axis current instruction value id* and q-axis current instruction value iq*.

In this case, when, for example, a driver attempts to quickly start the electric car by depressing the accelerator pedal 23, the d-axis current instruction value id* and the q-axis current instruction value iq* may often change sharply. However, when the sampling periods of the detection currents iu, iv and iw are long, the gain in carrying out the feedback control can not be increased. Therefore, the sampling periods used are substantially shortened by estimating a d-axis current id and a q-axis current iq after the detection currents iu, iv and iw are sampled or, in this embodiment, by estimating the d-axis current id and the q-axis current iq after one sampling time, and executing the proportional integration control based on the estimated d-axis current idp, q-axis current iqp and on the d-axis current instruction value id* and q-axis current instruction value iq*.

In estimating the d-axis current id and the q-axis current iq, however, the currents Iu, Iv and Iw fed to the stator coils undergo changes, whereby the inductance La of the stator coils changes. Then, errors often occur in the estimated d-axis current idp and the q-axis current iqp. In this case, it becomes difficult to bring the d-axis current deviation Δid and the q-axis current deviation Δiq close to zero by relying upon the feedback control, and a steady deviation occurs between the d-axis current id and the q-axis current iq and between the d-axis current instruction value id* and the q-axis current instruction value iq*.

In this embodiment, therefore, a proportional control is executed based on the estimated d-axis current idp and q-axis current iqp, and an integration control is executed based on real d-axis current id and q-axis current iq.

For this purpose, therefore, the d-axis current id, on one hand, is sent to a current estimating unit 71 which is the current estimation processing means (not shown) in the drive motor control processing means to execute a current estimation processing in the current estimation unit 71, whereby a d-axis current id is calculated and estimated after a predetermined number of sampling timings or after one sampling timing in this embodiment. The estimated d-axis current idp is sent as an estimated current to a subtractor 81 which is the estimated deviation calculation processing means (not shown) in the drive motor control processing means. The d-axis current id, on the other hand, is sent as a real current to a subtractor 82 which is the real deviation calculation processing means (not shown) in the drive motor control processing means.

The current estimation unit 71 includes a multiplier (Ra) d1, a subtractor d2, a multiplier (T/Ld) d3 and an adder d4. If the present sampling timing is denoted by n−1, the next sampling timing by n, the present d-axis current id by id(n−1), the sampling period by T, the inductance of the stator coil on the d-axis by Ld, the resistance of the stator coil by Ra, and a value of the present voltage drop Vzd by Vzd(n−1), then, an estimated value id(n) of the d-axis current idp is given by, $$id(n)=id(n-1)+(T/Ld)\{Vzd(n-1)-Ra \cdot id(n-1)\}.$$

Then, the subtractor 81 executes an estimated deviation calculation processing, calculates a d-axis current deviation Δidp which is an estimated deviation between the d-axis current idp and the d-axis current instruction value id*. The subtractor 82 executes a real deviation calculation processing, calculates a d-axis current deviation Δid which is a real deviation between the d-axis current id and the d-axis current instruction value id*. The d-axis current deviations Δidp and Δid are sent to a voltage instruction value calculation unit 78 which is the voltage instruction value calculation processing means (not shown) in the drive motor control processing means.

Similarly, the q-axis current iq, in one hand, is sent to the current estimation unit 72 which is the current estimation processing means where a current estimation processing is executed to calculate and estimate a q-axis current iq after a predetermined number of sampling timings or after one sampling timing in this embodiment. The estimated q-axis current iqp is sent as an estimated current to a subtractor 86 which is the estimated deviation calculation processing means (not shown) in the drive motor control processing means. The q-axis current iq, on the other hand, is sent as a real current to a subtractor 87 which is the real deviation calculation processing means (not shown) in the drive motor control processing means.

The current estimation unit 72 includes a multiplier (Ra) q1, a subtractor q2, a multiplier (T/Lq) q3 and an adder q4. If the present sampling timing is denoted by n−1, the next sampling timing by n, the present q-axis current iq by iq(n−1), the inductance of the stator coil on the q-axis by Lq, the resistance of the stator coil by Ra, and a value of the present voltage drop Vzq by Vzq(n−1), then, an estimated value iq(n) of the q-axis current iqp is given by, $$iq(n)=iq(n-1)+(T/Lq)\{Vzq(n-1)-Ra \cdot iq(n-1)\}.$$

Then, the subtractor 86 executes an estimated deviation calculation processing, calculates a q-axis current deviation Δiqp which is an estimated deviation between the q-axis current iqp and the q-axis current instruction value iq*. The subtractor 87 executes a real deviation calculation processing, calculates a q-axis current deviation Δiq which is a real deviation between the q-axis current iq and the q-axis current instruction value iq*. The q-axis current deviations Δiqp and Δiq are sent to a voltage instruction value calculation unit 79 which is the voltage instruction value calculation processing means (not shown) in the drive motor control processing means.

Then, the voltage instruction value calculation units 78, 79, which are proportional integration operation processing means (not shown) in the drive motor control processing means, execute a proportional integration (PI) operation processing. Namely, the voltage instruction value calculation unit 78 executes the voltage instruction value calculation processing to calculate a d-axis voltage instruction value vd* which is a voltage instruction value with which the d-axis current deviations Δidp and Δid will become zero, and the voltage instruction value calculation unit 79 executes the voltage instruction value calculation processing to calculate a q-axis voltage instruction value vq* which is a voltage instruction value with which the q-axis current deviations Δiqp and Δiq will become zero.

For this purpose, the voltage instruction value calculation unit 78 includes a proportional operation unit 83 which is proportional operation processing means, an integration operation unit 84 which is integration operation processing means, an adder 85 which is voltage drop calculation processing means, and a subtractor 74 which is voltage calculation processing means. In the proportional operation unit 83, a proportional operation processing is executed by a limiter d11 and a gain multiplier (Gpd) d12, whereby a voltage drop Vzdp representing a voltage instruction value of a proportional term is calculated as a proportional operation value, i.e., $$Vzdp=Gpd \cdot \Delta idp$$

based on the d-axis current deviation Δidp and the gain Gpd for the proportional operation. In the integration operation unit 84, an integration operation processing is executed by an integrator (1/s) d13, a limiter d14 and a gain multiplier (Gid) d15, whereby a voltage drop Vzdi representing a voltage instruction value of an integration term is calculated as an integration operation value, i.e., $$Vzdi=Gid \cdot \Sigma \Delta id$$

based on the d-axis current deviation Δid and the gain Gid for the integration operation, and the adder 85 executes a voltage drop calculation processing to add together voltage drops Vzdp and Vzdi to thereby calculate a voltage drop Vzd, $$Vzd = Vzdp + Vzdi$$
$$= Gpd \cdot \Delta idp + Gid \cdot \Sigma \Delta id.$$

The limiter d11 limits the d-axis current deviation Δidp so it will not diverge, and the limiter d14 limits the integrated value ΣΔid so it will not diverge.

Further, induced voltage calculation processing means (not shown) in the drive motor control processing means executes an induced voltage calculation processing, reads an electric angular velocity ω and a q-axis current iqp, and calculates an induced voltage ed induced by the q-axis current iq through a multiplier (Lq) q16 and a multiplier (ω) q17, i.e., $$ed=\omega \cdot Lq \cdot iq$$

based on the electric angular velocity ω, the q-axis current iqp and the inductance Lq on the q-axis.

Then, the subtractor 74 subtracts the induced voltage ed from the voltage drop Vzd sent from the adder 85, and calculates a d-axis voltage instruction value vd* which is an output voltage, i.e., $$vd^* = Vzd - ed$$
$$= Vzd - \omega \cdot Lq \cdot iq.$$

Thus, when the d-axis voltage instruction value vd* is generated so that the d-axis current deviations Δidp and Δid will become zero, then, the d-axis voltage instruction value vd* is sent to the two phase/three phase converter unit 67, which is the second conversion processing means in the drive motor control unit 45 through a limiter d19. The limiter d19 limits the d-axis voltage instruction value vd* so that it will not diverge.

The voltage instruction value calculation unit 79 includes a proportional operation unit 88 which is proportional operation processing means, an integration operation unit 89 which is integration operation processing means, an adder 90 which is voltage drop calculation processing means, and an adder 76 which is voltage calculation processing means. In the proportional operation unit 88, a proportional operation processing is executed by a limiter q11 and a gain multiplier (Gpq) q12, whereby a voltage drop Vzqp representing a voltage instruction value of a proportional term is calculated as a proportional operation value, i.e., $$Vzqp = Gpq \cdot \Delta iqp$$

based on the q-axis current deviation Δiqp and the gain Gpq for the proportional operation. In the integration operation unit 89, an integration operation processing is executed by an integrator (1/s) q13, a limiter q14 and a gain multiplier (Giq) q15, whereby a voltage drop Vzqi representing a voltage instruction value of an integration term is calculated as an integration operation value, i.e., $$Vzqi = Giq \cdot \Sigma \Delta iq$$

based on the q-axis current deviation Δiq and the gain Giq for the integration operation, and the adder 90 executes a voltage drop calculation processing to add up voltage drops Vzqp and Vzqi to thereby calculate a voltage drop Vzq, $$Vzq = Vzqp + Vzqi$$
$$= Gpq \cdot \Delta iqp + Giq \cdot \Sigma \Delta iq.$$

The limiter q11 limits the q-axis current deviation Δidq so that it will not diverge, and the limiter q14 limits the integrated value ΣΔiq so that it will not diverge.

Further, induced voltage calculation processing means (not shown) in the drive motor control processing means executes an induced voltage calculation processing, reads an electric angular velocity ω and a d-axis current id, and calculates an induced voltage eq induced by the d-axis current id through a multiplier (Ld) d16, an adder d17 and a multiplier (ω) d18, i.e., $$eq = \omega(MIf + Ld \cdot id)$$

based on the electric angular velocity ω, a counter electromotive force constant MIf, the d-axis current idp and the inductance Ld on the d-axis.

Then, the adder 76 adds the induced voltage eq to the voltage drop Vzq sent from the adder 90, and calculates a q-axis voltage instruction value vq* which is an output voltage, i.e., $$vq^* = Vzq + eq$$
$$= Vzq + \omega(MIf + Ld \cdot id).$$

Thus, the q-axis voltage instruction value vq* is generated so that the q-axis current deviations Δiqp and Δiq will become zero, and the q-axis voltage instruction value vq* is sent to the two phase/three phase converter unit 67 through a limiter q19. The limiter q19 limits the q-axis voltage instruction value vq* so that it will not diverge.

The second instruction value calculation processing means comprises the voltage instruction value calculation processing means, the second instruction value calculation processing is provided by the voltage instruction value calculation processing, whereby the d-axis voltage instruction value vd* and the q-axis voltage instruction value vq* are produced. Further, the instruction value calculation processing means 91 comprises the first and second instruction value calculation processing means.

Then, the two phase/three phase converter unit 67 reads the d-axis voltage instruction value vd*, q-axis voltage instruction value vq* and magnetic pole position θ, executes the two phase/three phase conversion which is the second conversion processing, converts the d-axis voltage instruction value vd* and the q-axis voltage instruction value vq* into voltage instruction values Vu*, Vv* and Vw* of the U-phase, V-phase and W-phase, and sends the voltage instruction values Vu*, Vv* and Vw* to the PWM generator 68, which is the output signal calculation processing means in the drive motor control unit 45.

The PWM generator 68 executes an output signal calculation processing, generates, as output signals, pulse width modulation signals Mu, Mv and Mw of the phases having pulse widths corresponding to the d-axis current instruction value id* and the q-axis current instruction value iq* based on the voltage instruction values Vu*, Vv* and Vw* of the phases and on the DC voltage Vdc, and sends them to the drive circuit 51 arranged outside the drive motor control unit 45.

Upon receipt of the pulse width modulation signals Mu, Mv and Mw of the phases, the drive circuit 51 generates six gate signals and sends the gate signals to the inverter 40. In response to the pulse width modulation signals Mu, Mv and Mw, the inverter 40 turns the transistors Tr1 to Tr6 on/off to generate currents Iu, Iv and Iw of three phases. The currents Iu, Iv and Iw of three phases are supplied to the stator coils of the drive motor 31.

Thus, the torque is controlled based on the target drive motor torque TM*, the drive motor 31 is driven, and the electric car runs.

Figure 8:
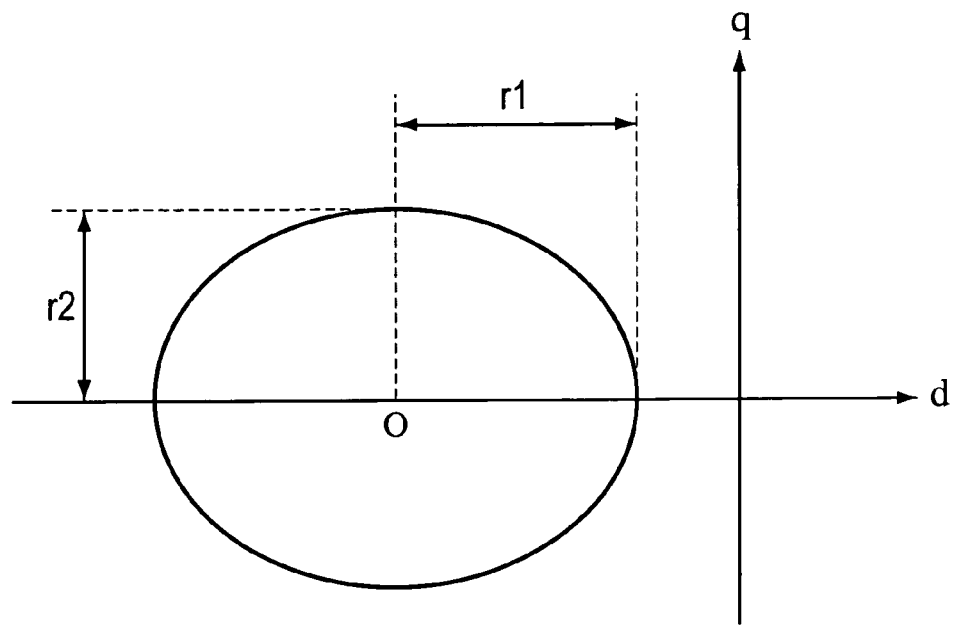
FIG. 8 is a diagram illustrating a voltage limit ellipse according to the first embodiment of the invention.

Here, in the drive motor 31, when the currents Iu, Iv and Iw of three phases are to be supplied to the stator coils maintaining a predetermined amplitude and phase, it becomes necessary to turn the transistors Tr1 to Tr6 of the inverter 40 on/off by taking the resistance Ra, inductances Ld, Lq and counter electromotive force into consideration to apply predetermined voltages Vu, Vv and Vw to the stator coils. However, as the counter electromotive force increases, accompanying an increase in the electric angular velocity ω in the rotational speed NM of the drive motor, it becomes no longer possible to apply the predetermined voltages Vu, Vv and Vw to the stator coils at a given battery voltage VB (or DC voltage Vdc), and the drive motor 31 reaches a limit of output represented by a voltage limit ellipse in a rotational coordinate system defined by a d-axis and a q-axis as shown in FIG. 8. As the drive motor 31 reaches the output limit, the proportional integration processing executed by the proportional integration processing means diverges.

Here, if an instruction voltage, when the pulse width modulation signals Mu, Mv and Mw becomes "full-on status" (i.e., the "one time which is represented by a pulse width becomes a maximum), is denoted by Vlim, then, there is obtained, $$Vlim^2 = \sqrt{(vdlim^2 + vqlim^2)}. \quad (1)$$

Then, the d-axis voltage instruction value vdlim and the q-axis voltage instruction value vqlim in the steady state are given by, $$vdlim = Ra \cdot idlim - \omega \cdot Lq \cdot iqlim \quad (2)$$

$$vqlim = Ra \cdot iqlim + \omega(MIf + Ld \cdot idlim). \quad (3)$$

Therefore, if the equations (2) and (3) are substituted for the equation (1) and if it is presumed that the resistance Ra is small, then, the voltage limit ellipse can be expressed by the following equation (4), whereby the coordinate at the center of the voltage limit ellipse is given by O(−MIf/Ld, 0), the long radius r1 is given by, $$r1 = Vlim/(\omega \cdot Ld)$$

and the short radius r2 is given by, $$r2 = Vlim/(\omega \cdot Lq). \quad (4)$$

Here, as described above, the output limit of the drive motor 31 is expressed by the above voltage limit ellipse, and it is not allowed to employ a d-axis current instruction value id* or a q-axis current instruction value iq* lying outside the voltage limit ellipse. The d-axis current instruction value id* and the q-axis current instruction value iq*, $$id^* = MIf/Ld$$

$$iq^* = 0$$

expressed by the center of the voltage control ellipse become the safest values against the voltage saturation, and the d-axis current instruction value id* and the q-axis current instruction value iq* represented by points close to the voltage limit ellipse tend to cause the control to diverge due to voltage saturation. Therefore, the change λ in the voltage saturation can be expressed by the magnitude of the instruction voltage Vom or by the on time of the pulse width modulation signals Mu, Mv and Mw.

Here, if unrealistic d-axis current instruction value id* and q-axis current instruction value iq* are set under the conditions where there are errors in the detection by the sensors, such as current sensors 33, 34, magnetic pole position sensor 21 and/or voltage sensor 15, or where unit constants, such as counter electromotive force constant MIf, inductances Ld, Lq and resistance Ra, are varying accompanying a change in the temperature, then, the voltage is saturated, a deviation occurs between the target drive motor torque TM* and the drive motor torque TM that is really produced, and the driver feels it difficult or uncomfortable to drive or it becomes difficult to drive the drive motor 31.

Figure 9:
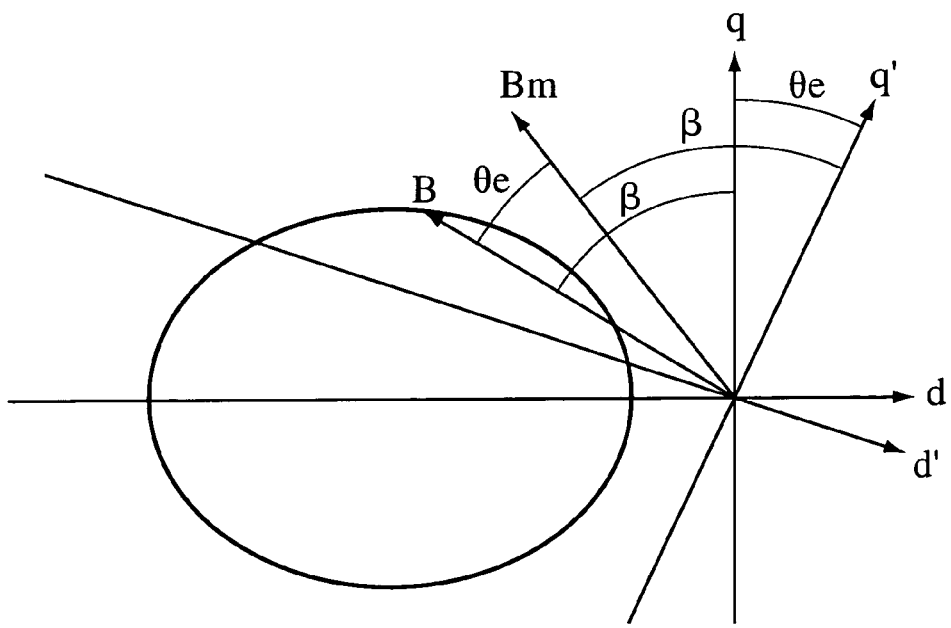
FIG. 9 is a diagram illustrating the operation of the electric drive control apparatus according to the first embodiment of the invention.
Figure 10:
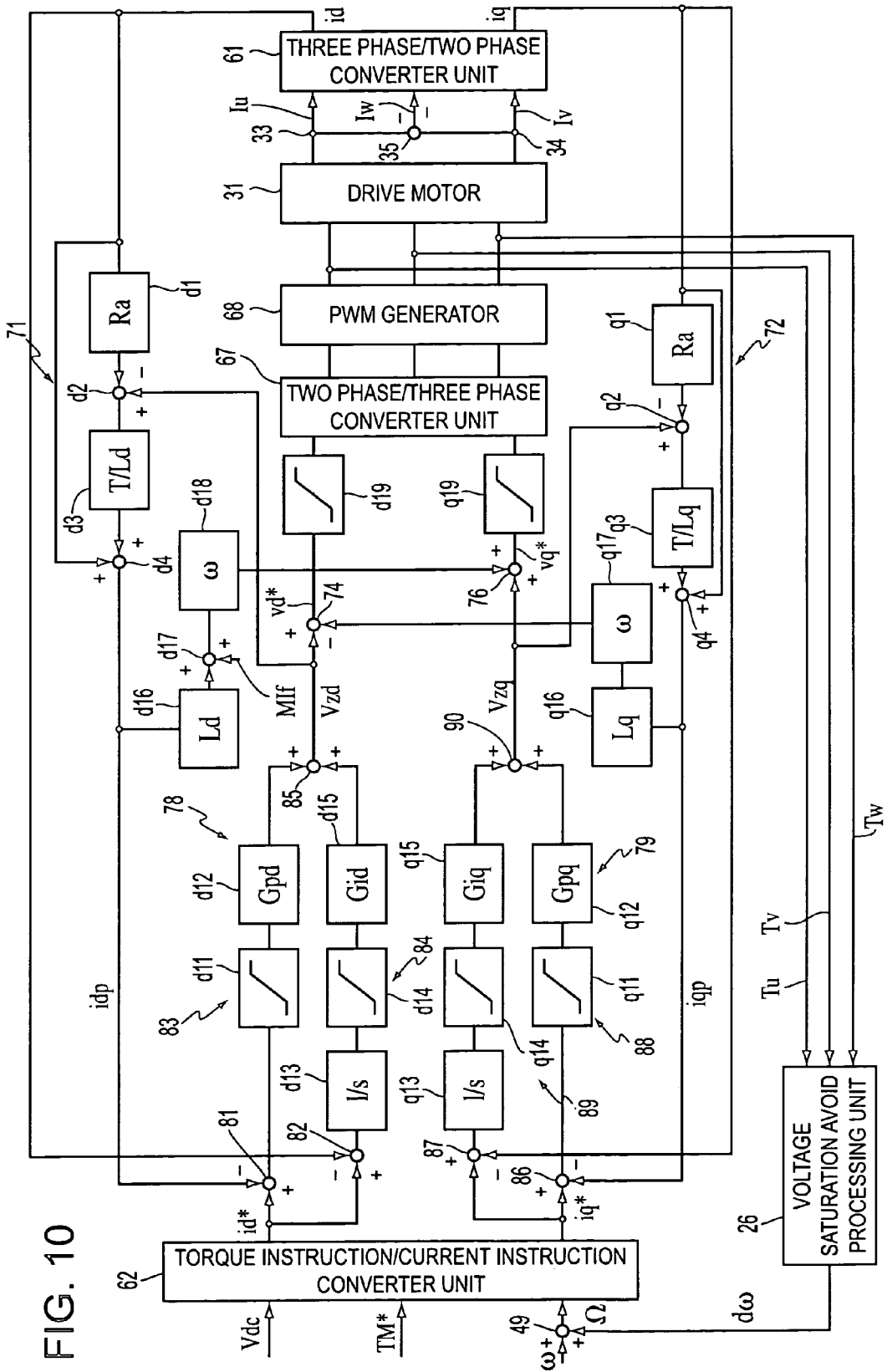
FIG. 10 is a block diagram of the electric drive control apparatus according to a second embodiment of the invention.

In the rotational coordinate system defined by the d-axis and the q-axis, for example, a current instruction value can be expressed by a vector B consisting of a vector length E and a current phase β, as shown in FIG. 9, and the d-axis current instruction value id* and the q-axis current instruction value iq* are given by, $$id^* = -B \cdot \sin \beta$$

$$iq^* = B \cdot \cos \beta.$$

In this case, if an error θe occurs on the magnetic pole position θ detected by the magnetic pole position sensor 21, there is formed a rotational coordinate system constituted by d'-axis and q'-axis, whereby a current is supplied to the stator coils maintaining a current phase β−θe to generate a current instruction value expressed by a vector Bm turned by the error θe. As a result, the vector Bm lies outside the voltage control ellipse and the voltage is saturated.

Figure 4:
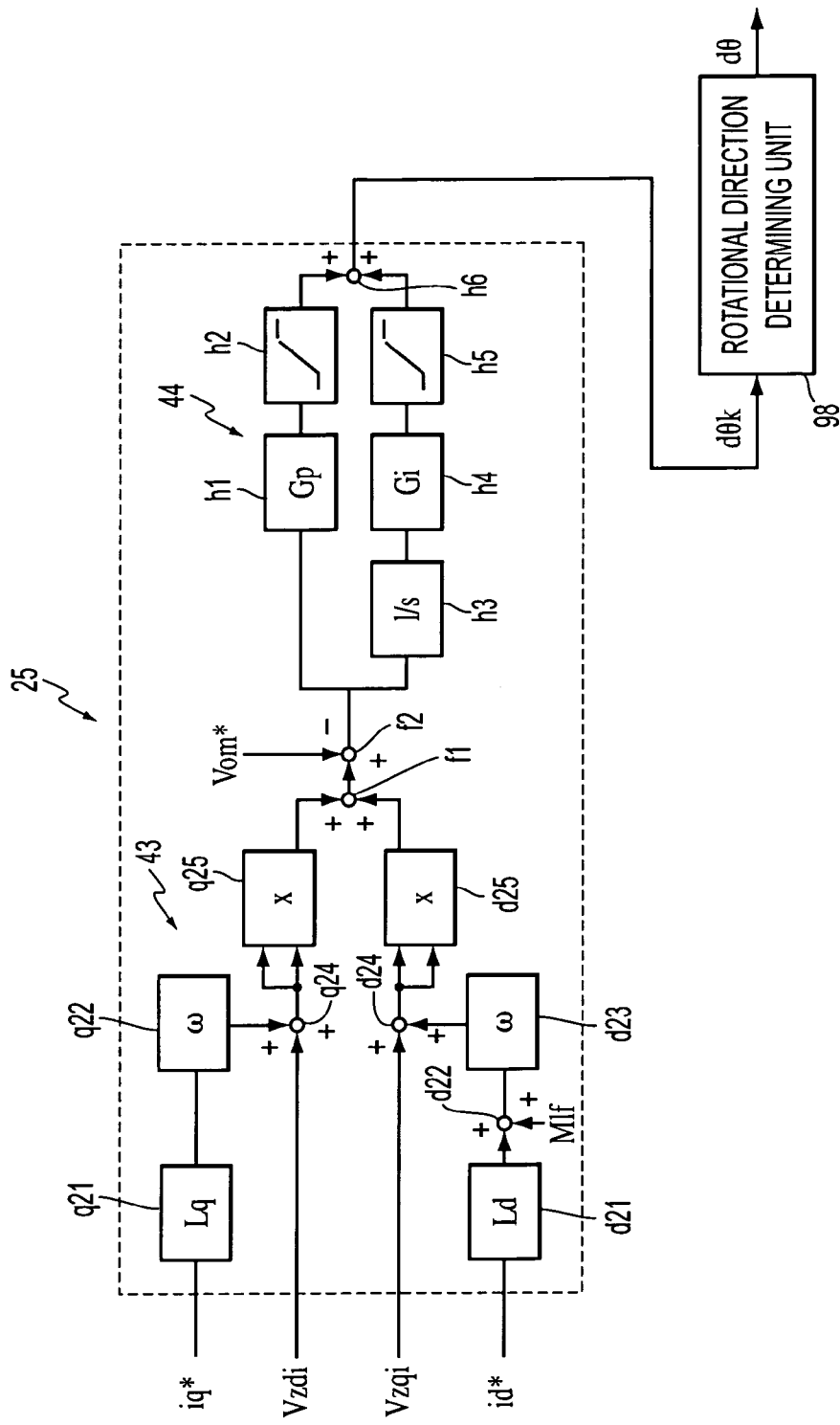
FIG. 4 is a block diagram of a voltage saturation avoid processing unit according to the first embodiment of the invention.

In order to prevent the saturation of voltage, therefore, the drive motor control unit 45 is provided with a voltage saturation avoid processing unit 25 (FIG. 4) and an adder 95. The voltage saturation avoid processing unit 25 includes a change-in-the-voltage-saturation calculation unit 43 which is the change-in-the-voltage-saturation calculation processing means 92 and a magnetic pole position correction calculation unit 44 which is the magnetic pole position correction calculation processing means. A change-in-the-voltage-saturation calculation unit 43 executes a change-in-the-voltage-saturation calculation processing to calculate a change that is not affected by noise or, in this embodiment, to calculate a change λ in the voltage saturation based on the d-axis current instruction value id*, q-axis current instruction value iq*, and voltage drops Vzdi, Vzqi. The magnetic pole position correction calculation unit 44 executes a magnetic pole position correction calculation processing and executes a proportional integration operation based on the change λ in the voltage saturation to calculate a magnetic pole position correction amount dθ for correcting the magnetic pole position θ. The adder 95 adds the magnetic pole position correction amount dθ to the magnetic pole position θ to correct the magnetic pole position θ, and calculates a corrected magnetic pole position θ.

In the change-in-the-voltage-saturation calculation unit 43, therefore, a voltage instruction value ω·Lq·iq* of the non-interference term is calculated through the multiplier (Lq) q21 and the multiplier (ω) q22 based on the q-axis current instruction value iq*, and a d-axis voltage instruction value vdf* is calculated through the adder q24 by adding the voltage instruction value ω·Lq·iq* of the non-interference term and a voltage drop Vzdi representing the voltage instruction value of the integration term. Further, a voltage instruction value ω(MIf+Ld·id*) of the non-interference term is calculated through the multiplier (Ld) d21, adder d22 and multiplier (ω) d23 based on the d-axis current instruction value id*, and a q-axis voltage instruction value vqf* is calculated through the adder d24 by adding up the voltage instruction value ω(MIf+Ld·id*) of the non-interference term and the voltage drop Vzqi representing a voltage instruction value of the integration term.

The d-axis current instruction value id* and the q-axis current instruction value iq* are calculated based on the electric angular velocity ω. Here, in calculation, the electric angular velocity ω does not contain error for the magnetic pole position θ, and is not affected by noise. Further, the voltage drops Vzdi and Vzqi are calculated through the integration operation processing by the integration operation units 84, 89, and the effect of noise is negligible. Accordingly, the d-axis voltage instruction value vdf* and the q-axis voltage instruction value vqf* are not affected by noise. Further, the d-axis voltage instruction value vdf* and the q-axis voltage instruction value vqf* are calculated based on the d-axis current instruction value id* and the q-axis current instruction value iq* making it possible to detect the voltage saturation at an early time.

Voltage drops Vzdp and Vzqp representing a voltage instruction value of the proportional term are nearly zero in the steady state, and can be neglected in calculating the d-axis voltage instruction value vdf* and the q-axis voltage instruction value vqf*.

Then, the d-axis voltage instruction value vdf* is multiplied by itself through the multiplier d25(x), the q-axis voltage instruction value vqf* is multiplied by itself through the multiplier q25(x), and the value vdf*$^2$ and the value vqf*$^2$ are added together through the adder f1 to calculate an instruction voltage Vom, $$Vom = \sqrt{(vdf^{*2} + vqf^{*2})}.$$

Permissible voltage calculation processing means (not shown) in the drive motor control unit 45 executes a permissible voltage calculation processing, reads a DC voltage Vdc, and calculates a permissible voltage at which the voltage saturation does not occur based on the DC voltage Vdc. The change-in-the-voltage-saturation calculation unit 43 reads the permissible voltage, sets the permissible voltage as an instruction voltage limit value Vom, $$Vom^* = \sqrt{8((2/3)Vdc)}$$

representing a target value of the instruction voltage Vom, and the subtractor f2 calculates a deviation ΔVom, $$\Delta Vom = Vom - Vom^*$$

between the instruction voltage Vom and the instruction voltage limit value Vom*. The change-in-the-voltage-saturation calculation unit 43 further calculates a change λ in the voltage saturation, $$\lambda = \Delta Vom.$$

Although the instruction voltage limit value Vom* is a theoretical value, it is, in practice, desired to use an upper limit value of the instruction voltage Vom which is found through experiment and with which the current control is stabilized.

As the change λ in the voltage saturation is calculated as described above, a proportional component Gp·ΔVom is calculated by a gain multiplier (Gp)h1 based on the deviation ΔVom in the magnetic pole position correction calculation unit 44 and is limited by a limiter h2 and is set to be zero when it assumes a value smaller than zero. Further, the deviation ΔVom is integrated through an integrator (1/s) h3 to calculate an integrated value ΣΔVom. An integration component Gi·ΣΔVom is calculated by a gain multiplier (Gi) h4 and is limited by a limiter h5, and is cleared when it assumes a value smaller than zero.

Then, the proportional component Gp·ΔVom and the integration component Gi·ΣΔVom are added together through the adder h6 to calculate an initial magnetic pole position correction amount dθk, $$d\theta k = Gp \cdot \Delta Vom + Gi \cdot \Sigma \Delta Vom.$$

The initial magnetic pole position correction amount dθk, that is calculated as described above, is sent to the rotational direction determining unit 98 which is rotational direction determination processing means for determining in which one of the forward or the reverse direction the magnetic pole position θ be corrected. The rotational direction determining unit 98 judges whether the drive motor 31 is in a powering state in which the dive motor 31 produces a drive motor torque TM or in a regenerating state of receiving a torque from the external unit. When the drive motor 31 is in the powering state, the magnetic pole position correction amount dθ is so determined that the magnetic pole position θ is corrected in the reverse direction. When the drive motor 31 is in the regenerating state, the magnetic pole position correction amount dθ is so determined that the magnetic pole position θ is corrected in the forward direction.

Then, the adder 95 adds the magnetic pole position correction amount dθ to the magnetic pole position θ to correct the magnetic pole position θ and to calculate the corrected magnetic pole position Θ. Magnetic pole position correction processing means is provided by the magnetic pole position correction calculation unit 44 and the adder 95. Further, change-in-the-control-quantity correction processing means is provided by the magnetic pole position correction processing means, the change-in-the-control-quantity correction processing 93 is provided by the magnetic pole position correction processing, and a change in the control quantity is provided by the magnetic pole position θ.

Thus, the change λ in the voltage saturation is calculated, and the magnetic pole position θ is corrected in response to the deviation ΔVom toward the safe side relative to the voltage saturation. Therefore, the voltage is prevented from being saturated even by using the magnetic pole position sensor 21 that generates a large error θe at the magnetic pole position θ. Therefore, the driver does not feel uncomfortable to drive the electric car, or the voltage is not saturated making it difficult to drive the drive motor 31.

Further, the change λ in the voltage saturation is calculated based on the voltage instruction values ω·Lq·iq*, ω(MIf+Ld·id*) of the non-interference term and on the voltage drops Vzdi, Vzqi representing voltage instruction values of the integration term. Therefore, the voltage is reliably prevented from being saturated without being affected by noise.

Figure 5:
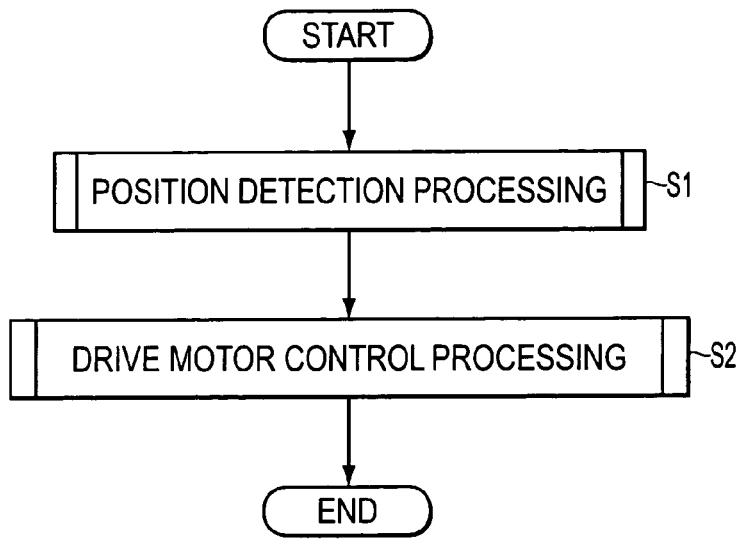
FIG. 5 is a main flowchart illustrating the operation of the electric drive control apparatus according to the first embodiment of the invention.

In the flowchart of FIG. 5, step S1 executes a position detection processing, and step S2 executes a drive motor control processing to end the processing.

Figure 6:
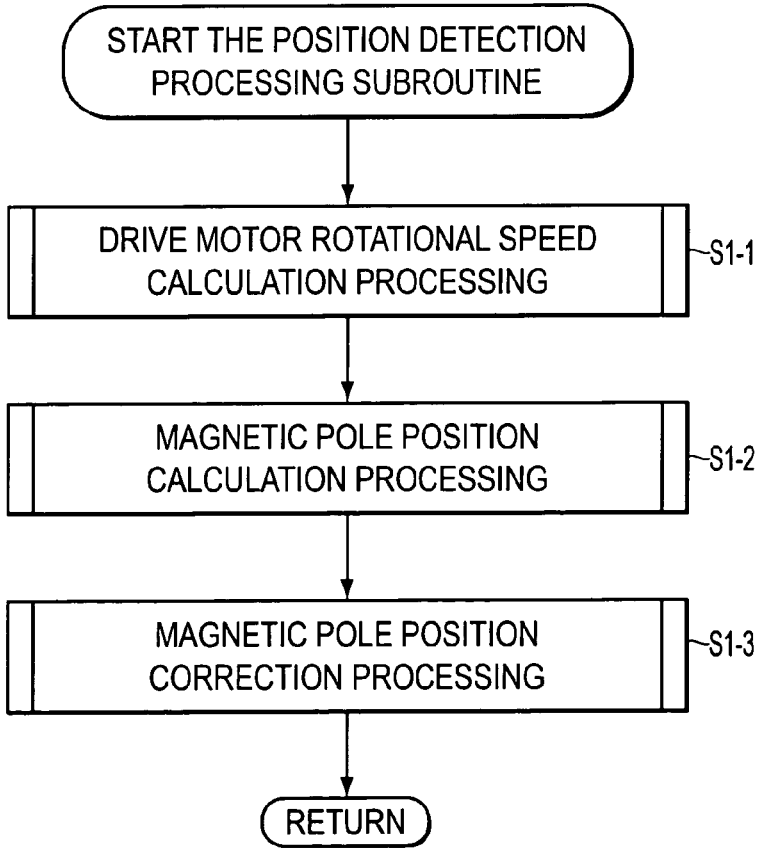
FIG. 6 is a diagram illustrating a subroutine of a position detection processing according to the first embodiment of the invention.

The position detection processing of step S1 is found in the flowchart of FIG. 6. At step S1-1 the drive motor rotational speed calculation processing is executed. Then in step S1-2 the magnetic pole position calculation processing is executed, in step S1-3 the magnetic pole position correction processing is executed and the processing returns to step S2.

Figure 7:
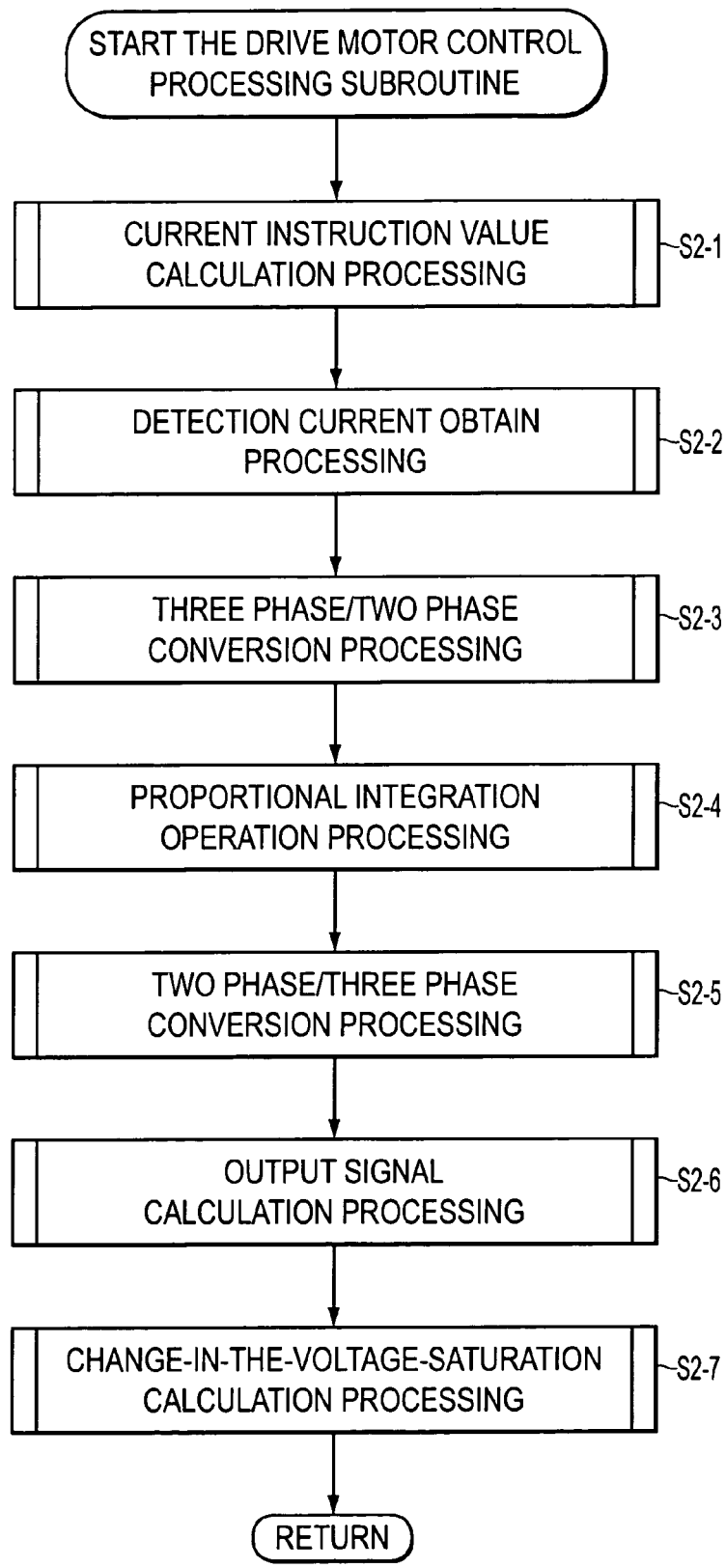
FIG. 7 is a diagram illustrating a subroutine of a drive motor control processing means according to the first embodiment of the invention.

The actions of step S2 are shown in the flowchart of FIG. 7. At step S2-1 the current instruction value calculation processing is executed and followed, at step S2-2, with the execution of the detection current obtain processing. Following step S2-2, at step S2-3 a three phase/two phase conversion processing is executed. This is followed, in order, by step S2-4 executing proportional integration operation processing; step S2-5 executing a two phase/three phase conversion processing; and step S2-6 executing an output signal calculation processing. Lastly, at step S2-7 the change-in-the-voltage-saturation calculation processing is executed, and processing returns to the base program.

A second embodiment of the invention in which the change λ in the voltage saturation is represented by the magnitude of the instruction voltage Vom or by the on times of the pulse width modulation signals Mu, Mv and Mw is described below using FIGS. 10–16.

In this embodiment, the operation of the drive motor control processing is the same as that of the first embodiment. Therefore, the operation of the drive motor control processing is not described but the operation of the position detection processing only is described.

In this case, position detection processing means (not shown) in the drive motor control unit 45 (FIG. 2) executes the position detection processing, reads a magnetic pole position signal SGθ sent as a sensor output from the magnetic pole position sensor 21 which is a magnetic pole position detection unit, and detects a magnetic pole position θ based on the magnetic pole position signal SGθ. For this purpose, rotational speed calculation processing means (not shown) in the position detection processing means executes a rotational speed calculation processing, calculates an average velocity between pulses which are the magnetic pole position signals SGθ as an electric angular velocity ω of the drive motor 31, which is the electrically operated machine, and rotational speed correction processing means (not shown) in the position detection processing means executes a rotational speed correction processing, reads a change λ in the voltage saturation, and corrects the electric angular velocity ω based on the change λ in the voltage saturation.

Reference numeral 62 denotes a torque instruction/current instruction converter unit serving as current instruction value calculation processing means in the drive motor control processing means. The torque instruction/current instruction converter unit 62 reads the DC voltage Vdc, corrected electric angular velocity Ω and target drive motor torque TM*, converts the electric angular velocity Ω into the rotational speed NM of the drive motor, makes a reference to the map of current instruction values, and calculates, as current instruction values, a d-axis current instruction value id* and a q-axis current instruction value iq* corresponding to the target drive motor torque TM*.

Here, the magnetic pole position sensor 21 calculates an average speed between pulses which are the magnetic pole position signals SGθ as the electric angular velocity ω of the drive motor 31. In this case, when the velocity greatly varies due to vibration in the drive motor 31, an error ωe may occur in the detected electric angular velocity ω, and the voltage may saturate. When the electric angular velocity ω is judged to be low and when a current instruction value, represented by vector B1, selected though the angular velocity really is high, then, the voltage is saturated unless a current instruction value represented by a vector B2 is selected on an equi-torque curve represented by a predetermined target drive motor torque TM*. L1 (FIG. 13) denotes a voltage saturation ellipse of when the electric angular velocity ω is judged to be low and L2 denotes a voltage saturation ellipse based on the real electric angular velocity ω.

In order to prevent the voltage from being saturated, therefore, a change λ in the voltage saturation is calculated based on the on times Tu, Tv and Tw of the pulse width modulation signals Mu, Mv and Mw, and the electric angular velocity ω is corrected based on the change λ in the voltage saturation.

Figure 11:
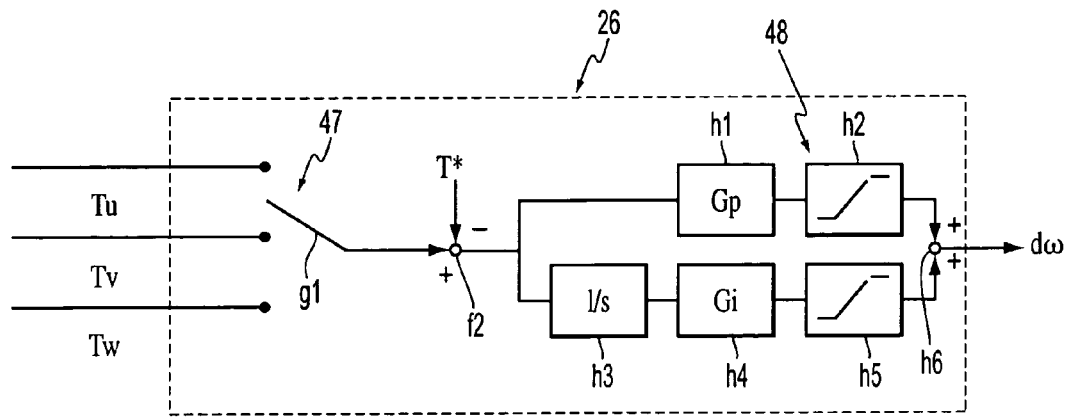
FIG. 11 is a block diagram of a voltage saturation avoid processing unit according to the second embodiment of the invention.

In this case, the drive motor control unit 45 is provided with a voltage saturation avoid processing unit 26 (FIGS. 10 and 11) and an adder 49 (FIG. 11). The voltage saturation avoid processing unit 26 includes a change-in-the-voltage-saturation calculation unit 47 which is the change-in-the-voltage-saturation calculation processing means 92 and a rotational speed correction quantity calculation unit 48 which is the rotational speed correction quantity calculation processing means. The change-in-the-voltage-saturation calculation unit 47 executes a change-in-the-voltage-saturation calculation processing to calculate a change that is not affected by noise due to an error e in the magnetic pole position θ or, in this embodiment, to calculate a change λ in the voltage saturation based on the on times Tu, Tv and Tw by reading the on times Tu, Tv and Tw of the pulse width modulation signals Mu, Mv and Mw. The rotational speed correction quantity calculation unit 48 executes a rotational speed correction quantity calculation processing, executes a proportional integration operation based on the change λ in the voltage saturation, and calculates an electric angular velocity correction amount dω to correct the electric angular velocity ω. The adder 49 adds the electric angular velocity correction amount dω to the electric angular velocity ω to correct the electric angular velocity ω and calculates a corrected electric angular velocity Ω.

In the change-in-the-voltage-saturation calculation unit 47, therefore, a selector g1, which is the selection processing means, executes the selection processing, reads the on times Tu, Tv and Tw at a predetermined sampling period T, and selects a maximum on time Tmax among the on times Tu, Tv and Tw. When the on time of the pulse width modulation signals Mu, Mv and Mw in the full-on state is denoted by Tfon, the change-in-the-voltage-saturation calculation unit 47 sets a value close to the on time Tfon as an on time limit value T* that represents a target value, and calculates a deviation ΔT, $$\Delta T = T max - T^*$$

between the on time Tmax and the on time limit value T* through a subtractor f2. Further, the change-in-the-voltage-saturation calculation unit 47 calculates a change λ in the voltage saturation, $$\lambda = \Delta T.$$

As the change λ in the voltage saturation is calculated as described above, a proportional component Gp·ΔT is calculated by the gain multiplier (Gp)h1 based on the deviation ΔT in the rotational speed correction quantity calculation unit 48 and is limited by the limiter h2 and is set to be zero when it assumes a value smaller than zero. Further, the deviation ΔT is integrated through the integrator (1/s) h3 to calculate an integrated value ΣΔT. An integration component Gi·ΣΔT is calculated by the gain multiplier (Gi) h4 and is limited by the limiter h5, and is cleared when it assumes a value smaller than zero.

Then, the proportional component Gp·ΔT and the integration component Gi·ΣΔT are added together through the adder h6 to calculate an electric angular velocity correction amount dω, $$d\omega = Gp \cdot \Delta T + Gi \cdot \Sigma \Delta T.$$

As the electric angular velocity correction amount dω is calculated as described above, the adder 49 adds the electric angular velocity correction amount dω to the electric angular velocity ω to correct the electric angular velocity ω and to calculate the electric angular velocity Ω. The electric angular velocity correction processing means is provided by the rotational speed correction quantity calculation unit 48 and the adder 49. Further, the change-in-the-control-quantity correction processing means 93 (FIG. 1) is provided by the electric angular velocity correction processing means, the change-in-the-control-quantity correction processing is provided by the electric angular velocity correction processing, and a change in the control quantity is provided by the electric angular velocity ω.

Thus, as the change λ in the voltage saturation is calculated, as the deviation ΔT decreases and as the change λ in the voltage saturation increases, then, the electric angular velocity ω is corrected depending upon the deviation ΔT and the change λ in the voltage saturation. Therefore, the voltage is prevented from being saturated even by using a sensor having a large error in the electric angular velocity ω as the magnetic pole position sensor 21 or even by using the drive motor 31 of which the speed varies to a large extent. Therefore, the driver does not feel uncomfortable driving the electric car, or the voltage is not saturated making it difficult to drive the drive motor 31.

Besides, because the on time limit value T* is not dependent upon the DC voltage Vdc, the operation can be simplified.

In this embodiment, a maximum on time Tmax is selected out of the on times Tu, Tv and Tw, and a deviation ΔT is calculated between the on time Tmax and the on time limit value T*. Among the on times Tu, Tv and Tw, the greatest one is denoted by Tmax, the second greatest one is denoted by Tmd1, and the smallest one is denoted by Tmin, and the weighting coefficients are denoted by ρ1 to ρ3. Then, the on time Tcul is calculated to be, $$Tcul = \rho 1 \cdot Tmax + \rho 2 \cdot Tmd1 + \rho 3 \cdot Tmin$$

and the deviation ΔT between the on time Tcul and the on time limit value T* is calculated.

Figure 12:
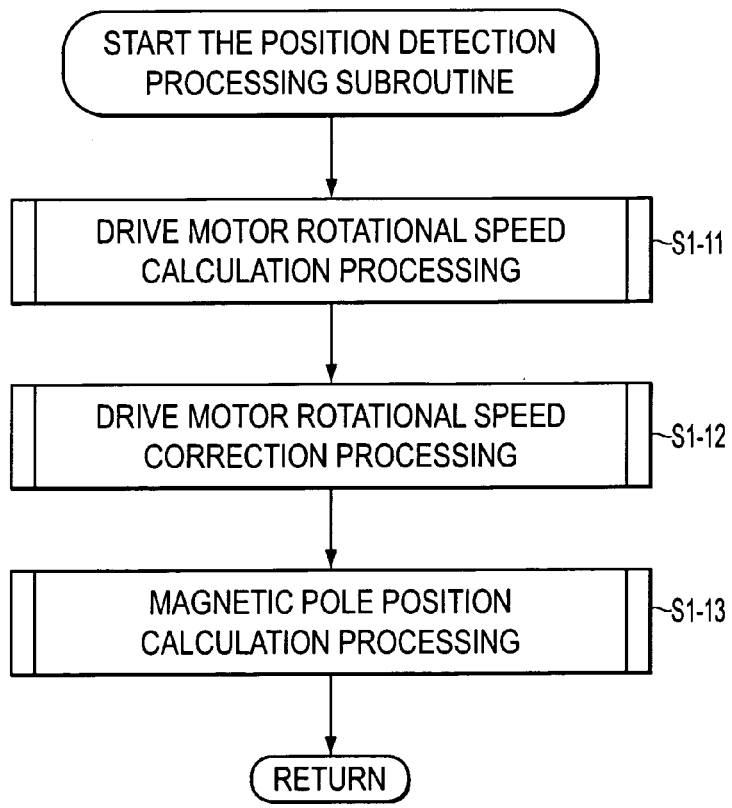
FIG. 12 is a diagram illustrating a subroutine of a position detection processing according to the second embodiment of the invention.
Figure 13:
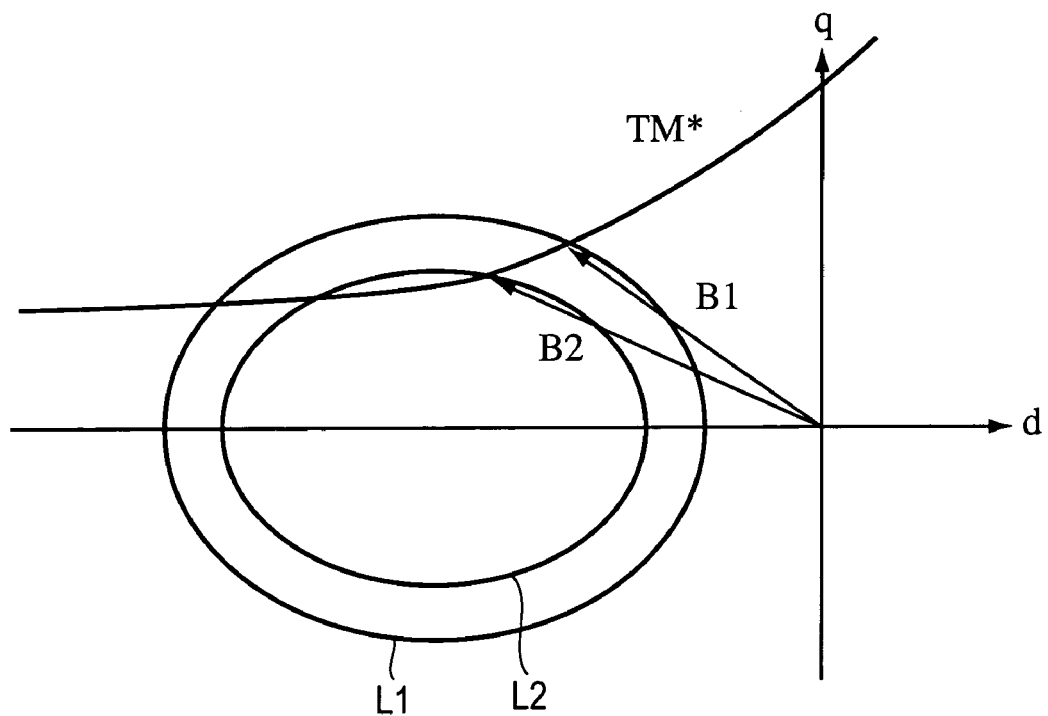
FIG. 13 is a diagram illustrating the operation of the electric drive control apparatus according to the second embodiment of the invention.
Figure 16:
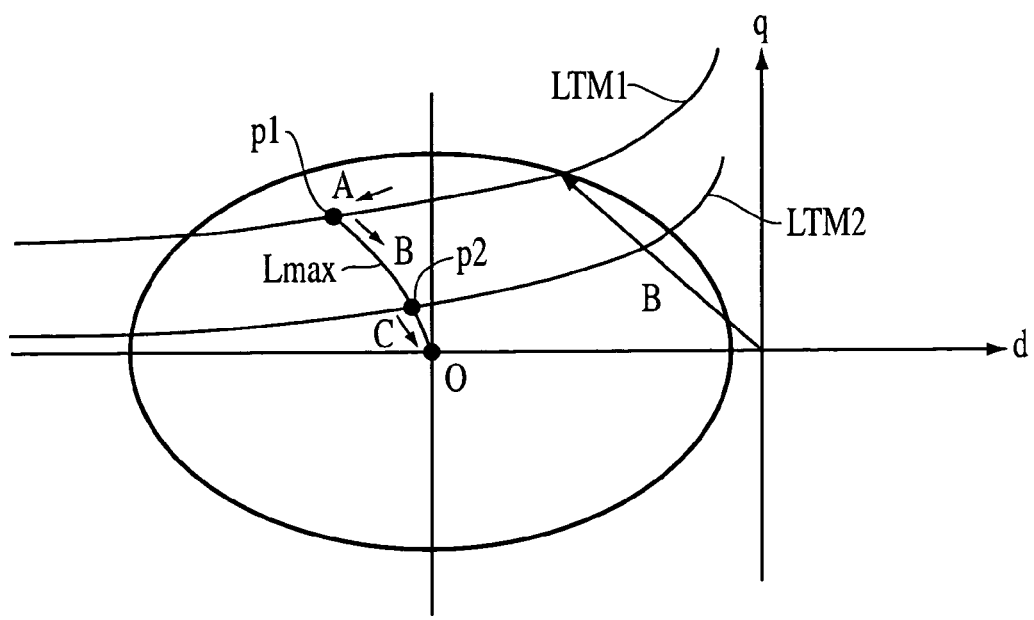
FIG. 16 is a diagram illustrating the operation for varying the current instruction value according to the second embodiment of the invention.

FIG. 12 is a flowchart of the second embodiment. In step S1-11 the drive motor rotational speed calculation processing is executed and in step S1-12 the drive motor rotational speed correction processing is executed. Then, in step S1-13 the magnetic pole position calculation processing is executed followed by a return in processing.

In order that the drive motor 31 produces a predetermined drive motor torque TM, a map of current instruction values representing vector lengths shown in FIG. 14, and a map of current phase instruction values shown in FIG. 15, are stored in the ROM of the drive motor control unit 45. It is also possible to provide a map of current instruction values, such as of d-axis current instruction value id* and q-axis current instruction value iq*, instead of the map of current instruction values and the map of current phase instruction values. FIG. 14 illustrates the map of current instruction values when the DC voltage Vdc is 42 [V]. Recorded in the map of the current instruction values are current instruction values corresponding to the target drive motor torque TM* and the drive motor rotational speed NM, and recorded in the map of the current phase instruction values (FIG. 15) are current phase instruction values corresponding to the target drive motor torque TM* and the drive motor rotational speed NM.

When, for example, the DC voltage Vdc is 42 [V], the drive motor rotational speed NM is 4000 [rpm] and the target drive motor torque TM* is 50 [Nm], then, the current instruction value representing the vector length becomes 338 [A] and the current phase instruction value becomes 51 [°]. The map of current instruction values and the map of current phase instruction values are those values in which the target drive motor torque TM* is on an equi-torque curve of 50 [Nm] and the current instruction value is a minimum inside the voltage limit ellipse. Upon minimizing the current instruction value, the drive motor 31 can be efficiently driven.

Further, the current instruction value and the current phase instruction value corresponding to the intermediate drive motor rotational speed NM and the target drive motor torque TM* are calculated by linear interpolation. At a predetermined DC voltage Vdc and at a predetermined drive motor rotational speed NM, there is a limit on the drive motor torque TM. Therefore, a current instruction value and a current phase instruction value corresponding to the drive motor torque TM that can be output are recorded in the map of current instruction values and in the map of current phase instruction values to cope with the production of a limit drive motor torque TM, i.e., to cope with the production of a target drive motor torque TM* greater than the limit. Therefore, when, for example, the DC voltage Vdc is 42 [V], the drive motor rotational speed NM is 6000 [rpm] and the target drive motor torque TM* is 90 [Nm], then, 510 [A] and 75 [°] are set as a current instruction value and as a current phase instruction value corresponding to the drive motor torque TM that can be produced in the current instruction value calculation processing. Therefore, the drive motor torque that is really output is 50 [Nm].

Usually, further, when a maximum value NMmax in the drive motor rotational speed NM is 10,000 [rpm] but the drive motor rotational speed NM is now, for example, 11000 [rpm] which is in excess of the maximum value NMmax, a current instruction value and a current phase instruction value located at the center of the voltage limit ellipse are recorded in the map of current instruction values and in the map of current phase instruction values. Therefore, when, for example, the DC voltage Vdc is 42 [V] and the drive motor rotational speed NM is 11000 [rpm], 300 [A] and 90 [°] are set as the current instruction value and the current phase instruction value.

The map of current instruction values and the map of current phase instruction values are thus set. While the DC voltage Vdc is 42 [V], the drive motor rotational speed NM is 4000 [rpm] and the target drive motor torque TM* is 50 [Nm], therefore, if the electric angular velocity ω is corrected in the rotational speed correction processing, the vector B (FIG. 16) representing the current instruction value, first, moves in the direction of an arrow A along an equi-torque curve LTM1 of 50 [Nm]. If the change λ in the voltage saturation is still high and it is likely that the voltage may be saturated, then, the vector B moves from a point p1 (510 [A] and 75 [°] are set as a current instruction value and a current phase instruction value) in the direction of an arrow B along a maximum output line Lmax of the drive motor 31 while raising the drive motor rotational speed NM, and moves to a point p2 (360 [A] and 75 [°] are set as a current instruction value and a current phase instruction value) on an equi-torque curve LTM2 of, for example, 30 [Nm].

Here, if the change λ in the voltage saturation is still high even at the point p2 and it is likely that the voltage may be saturated, the vector B further moves in the direction of an arrow C. In this case, the drive motor rotational speed NM at the point p2 is 10000 [rpm]. Therefore, 300 [A] and 90 [°] at the center O of the voltage limit ellipse are set as the current instruction value and the current phase instruction value.

Thus, use of the map of current instruction values and the map of current phase instruction values makes it possible to minimize a change in the drive motor torque TM and to carry out an automatic field weakening control.

In the above first embodiment, the magnetic pole position θ is corrected based on the change λ in the voltage saturation. However, it is also allowable to correct the electric angular velocity ω based on the change λ in the voltage saturation. In the second embodiment, therefore, the electric angular velocity ω is corrected based on the change λ in the voltage saturation. However, it is also allowable to correct the magnetic pole position θ based on the change λ in the voltage saturation.

Further, the invention is in no way limited to the above embodiments only but can be modified in a variety of ways based on the gist of the invention, and such modifications are not excluded from the scope of the invention.

According to the invention as described above in detail, an electric drive control apparatus comprises an electrically operated machine, instruction value calculation processing means for calculating an instruction value based on a target electrically operated machine torque representing a target value of the electrically operated machine torque and on the rotational speed of the electrically operated machine, output signal calculation processing means for calculating an output signal based on the instruction value, a current generating unit for generating a current based on the output signal and for supplying the current to the electrically operated machine, change-in-the-voltage-saturation calculation processing means for calculating, based on the instruction value, a change in the voltage saturation that varies depending upon the degree of occurrence of the voltage saturation accompanying the drive of the electrically operated machine, and change-in-the-control-quantity correction processing means for correcting a change in the control quantity based on the change in the voltage saturation.

Here, the change in the control quantity is a magnetic pole position of the electrically operated machine. In this case, the change in the voltage saturation is calculated accompanying the drive of the electrically operated machine, and the magnetic pole position is corrected depending on a change in the voltage saturation, making it possible to prevent the voltage from being saturated. Accordingly, the driver does not feel uncomfortable driving the electric vehicle, or the voltage is not saturated making it difficult to drive the electrically operated machine.

What is claimed is:

1. An electric drive control apparatus, comprising:
   an electrically operated machine;
   instruction value calculation processing means for calculating an instruction value based on a target electrically operated machine torque representing a target value of the electrically operated machine torque and on a rotational speed of the electrically operated machine;
   output signal calculation processing means for calculating an output signal based on the instruction value;
   a current generating unit that generates a current based on the output signal and that supplies the current to the electrically operated machine;
   change-in-the-voltage-saturation calculation processing means for calculating, based on the instruction value, a change in the voltage saturation that varies depending upon the degree of occurrence of the voltage saturation accompanying the drive of the electrically operated machine; and
   change-in-the-control-quantity correction processing means for correcting a change in the control quantity based on the change in the voltage saturation, the change in the control quantity being a magnetic pole position of the electrically operated machine.

2. The electric drive control apparatus according to claim 1, wherein the instruction value comprises a current instruction value and a voltage instruction value.

3. The electric drive control apparatus according to claim 2, wherein the voltage instruction value comprises a voltage instruction value of a non-interference term and a voltage instruction value of an integration term.

4. An electric drive control apparatus, comprising:
   an electrically operated machine;
   instruction value calculation processing means for calculating an instruction value based on a target electrically operated machine torque representing a target value of the electrically operated machine torque and on the rotational speed of the electrically operated machine;
   output signal calculation processing means for calculating an output signal based on the instruction value;
   a current generating unit that generates a current based on the output signal and that supplies the current to the electrically operated machine;
   change-in-the-voltage-saturation calculation processing means for calculating, based on the output signal, a change in the voltage saturation that varies depending upon the degree of occurrence of the voltage saturation accompanying the drive of the electrically operated machine; and
   change-in-the-control-quantity correction processing means for correcting a change in the control quantity based on the change in the voltage saturation, the change in the control quantity being a magnetic pole position of the electrically operated machine.

5. The electric drive control apparatus according to claim 4, wherein the change-in-the-voltage-saturation calculation processing means calculates a change in the voltage saturation based on the on time of the output signal.

6. An electric drive control apparatus, comprising:
   an electrically operated machine;
   instruction value calculation processing means for calculating an instruction value based on a target electrically operated machine torque representing a target value of an electrically operated machine torque and on the rotational speed of the electrically operated machine;
   output signal calculation processing means for calculating an output signal based on the instruction value;
   a current generating unit that generates a current based on the output signal and that supplies the current to the electrically operated machine;
   change-in-the-voltage-saturation calculation processing means for calculating, based on the instruction value, a change in the voltage saturation that varies depending upon the degree of occurrence of the voltage saturation accompanying the drive of the electrically operated machine; and
   change-in-the-control-quantity correction processing means for correcting a change in the control quantity based on the change in the voltage saturation, the change in the control quantity being a rotational speed of the electrically operated machine.

7. The electric drive control apparatus according to claim 6, wherein the instruction value comprises a current instruction value and a voltage instruction value.

8. The electric drive control apparatus according to claim 7, wherein the voltage instruction value comprises a voltage instruction value of a non-interference term and a voltage instruction value of an integration term.

9. The electric drive control apparatus according to claim 6, wherein an instruction value corresponding to an electrically operated machine torque that can be produced is generated when a target electrically operated machine torque generated accompanying the correction of the rotational speed of the electrically operated machine is greater than a limit electrically operated machine torque.

10. The electric drive control apparatus according to claim 6, wherein an instruction value that is generated at the center of a voltage limit ellipse as the rotational speed of the electrically operated machine becomes greater than a limit rotational speed of the electrically operated machine accompanying the correction of the rotational speed of the electrically operated machine.

11. An electric drive control apparatus, comprising:

an electrically operated machine;

instruction value calculation processing means for calculating an instruction value based on a target electrically operated machine torque representing a target value of the electrically operated machine torque and on the rotational speed of the electrically operated machine;

output signal calculation processing means for calculating an output signal based on the instruction value;

a current generating unit that generates a current based on the output signal and that supplies the current to the electrically operated machine;

change-in-the-voltage-saturation calculation processing means for calculating, based on the output signal, a change in the voltage saturation that varies depending upon the degree of occurrence of the voltage saturation accompanying the drive of the electrically operated machine; and change-in-the-control-quantity correction processing means for correcting a change in the control quantity based on the change in the voltage saturation, the change in the control quantity being a rotational speed of the electrically operated machine.

12. The electric drive control apparatus according to claim 11, wherein the change-in-the-voltage-saturation calculation processing means calculates a change in the voltage saturation based on the on time of the output signal.

13. The electric drive control apparatus according to claim 11, wherein an instruction value corresponding to an electrically operated machine torque that can be produced is generated when a target electrically operated machine torque generated accompanying the correction of the rotational speed of the electrically operated machine is greater than a limit electrically operated machine torque.

14. The electric drive control apparatus according to claim 11, wherein an instruction value is generated at the center of a voltage limit ellipse as the rotational speed of the electrically operated machine becomes greater than a limit rotational speed of the electrically operated machine accompanying the correction of the rotational speed of the electrically operated machine.

15. An electric drive control method, comprising:

calculating an instruction value based on a target electrically operated machine torque representing a target value of the electrically operated machine torque and on the rotational speed of the electrically operated machine;

calculating an output signal based on the instruction value;

generating a current based on the output signal;

supplying the current to the electrically operated machine;

calculating, based on the instruction value, a change in the voltage saturation that varies depending upon the degree of occurrence of the voltage saturation accompanying the drive of the electrically operated machine; and correcting the magnetic pole position depending upon the change in the voltage saturation.

16. A program for an electric drive control method, used with a computer, the program acting as:

instruction value calculation processing means for calculating an instruction value based on a target electrically operated machine torque representing a target value of the electrically operated machine torque and on the rotational speed of the electrically operated machine;

output signal calculation processing means for calculating an output signal based on the instruction value;

change-in-the-voltage-saturation calculation processing means for calculating, based on the instruction value, a change in the voltage saturation that varies depending upon the degree of occurrence of the voltage saturation accompanying the drive of the electrically operated machine; and change-in-the-control-quantity correction processing means for correcting a magnetic pole position based on the change in the voltage saturation.

\* \* \* \* \*